(12) United States Patent
Matsumura

(10) Patent No.: US 11,691,666 B2
(45) Date of Patent: Jul. 4, 2023

(54) POWER STEERING APPARATUS

(71) Applicant: HITACHI AUTOMOTIVE SYSTEMS, LTD., Hitachinaka (JP)

(72) Inventor: Tatsuo Matsumura, Higashimatsuyama (JP)

(73) Assignee: KNORR-BREMSE STEERING SYSTEM JAPAN LTD., Saitama (JP)

(*) Notice: Subject to any disclaimer, the term of this patent is extended or adjusted under 35 U.S.C. 154(b) by 932 days.

(21) Appl. No.: 16/323,594

(22) PCT Filed: Mar. 15, 2017

(86) PCT No.: PCT/JP2017/010433
§ 371 (c)(1),
(2) Date: Feb. 6, 2019

(87) PCT Pub. No.: WO2018/055803
PCT Pub. Date: Mar. 29, 2018

(65) Prior Publication Data
US 2019/0168802 A1 Jun. 6, 2019

(30) Foreign Application Priority Data
Sep. 20, 2016 (JP) .................. 2016-182555

(51) Int. Cl.
B62D 5/04 (2006.01)
B62D 6/02 (2006.01)
(Continued)

(52) U.S. Cl.
CPC ......... B62D 5/0481 (2013.01); B62D 5/0463 (2013.01); B62D 5/06 (2013.01);
(Continued)

(58) Field of Classification Search
CPC ...... B62D 5/0481; B62D 5/0463; B62D 5/06; B62D 5/065; B62D 5/0835; B62D 5/12; B62D 6/02
See application file for complete search history.

(56) References Cited

U.S. PATENT DOCUMENTS 5,078,226 A * 1/1992 Inagaki .................... B62D 6/04
180/422
2001/0023383 A1* 9/2001 Ishihara ............... B62D 5/0463
701/41
(Continued)

FOREIGN PATENT DOCUMENTS

| CN | 104602988 A | 5/2015 |
|---|---|---|
| CN | 105501293 A | 4/2016 |

(Continued)

OTHER PUBLICATIONS

English translation of Official Communication dated May 17, 2021 issued in corresponding German Patent Application No. 11 2017 004 715.3, 4 pages.

Primary Examiner — Donald J Wallace
(74) Attorney, Agent, or Firm — Foley & Lardner LLP

(57) ABSTRACT

Power steering device has steering mechanism 2, power cylinder 29 having a pair of hydraulic chambers 29a, 29b divided by piston 31 and providing steering force to steering mechanism, torque sensor 11 detecting steering torque Tr of steering mechanism, rotary valve 30 selectively supplying working fluid supplied from pump 9 to the pair of hydraulic chambers according to relative rotation between input and output shafts, hollow shaft motor 10 providing steering force to input shaft, control unit 13 in which microcomputer is mounted, and torque command signal operating section 61 provided in control unit and configured to calculate torque command signal Tm* for driving and controlling electric motor 10 on the basis of the steering torque Tr and vehicle (Continued)

speed Vs and when vehicle speed is a predetermined vehicle speed or greater, set torque command signal to 0. With this, physical size of power steering device can be decreased.

16 Claims, 13 Drawing Sheets

(51) Int. Cl.
 *B62D 5/083* (2006.01)
 *B62D 5/12* (2006.01)
 *B62D 5/065* (2006.01)
 *B62D 5/06* (2006.01)

(52) U.S. Cl.
 CPC ........... *B62D 5/065* (2013.01); *B62D 5/0835* (2013.01); *B62D 5/12* (2013.01); *B62D 6/02* (2013.01)

(56) References Cited

U.S. PATENT DOCUMENTS

| | | | | |
|---|---|---|---|---|
| 2005/0007052 | A1* | 1/2005 | Ozaki | B62D 5/065 318/445 |
| 2006/0175118 | A1* | 8/2006 | Hirakushi | B62D 5/065 180/422 |
| 2007/0043490 | A1* | 2/2007 | Yokota | B62D 5/046 701/41 |
| 2008/0033613 | A1* | 2/2008 | Tamaizumi | B62D 5/0463 701/41 |
| 2009/0120085 | A1* | 5/2009 | Yamaura | B62D 5/062 60/423 |
| 2010/0152971 | A1* | 6/2010 | Shiino | B62D 5/09 701/41 |
| 2010/0235047 | A1* | 9/2010 | Kurishige | B62D 5/0463 701/41 |
| 2011/0000738 | A1* | 1/2011 | Horii | B62D 5/0463 180/446 |
| 2011/0056755 | A1* | 3/2011 | Futahashi | B60W 10/02 180/65.25 |
| 2013/0032429 | A1* | 2/2013 | Aimo Boot | B60L 1/003 180/422 |
| 2013/0179040 | A1* | 7/2013 | Suzuki | H02P 21/0021 701/43 |
| 2013/0299271 | A1* | 11/2013 | Endo | B62D 5/046 180/446 |
| 2014/0074355 | A1* | 3/2014 | Kim | B62D 5/0463 701/41 |
| 2014/0345965 | A1* | 11/2014 | Ura | B62D 5/30 180/404 |
| 2015/0203153 | A1 | 7/2015 | Togashi et al. | |
| 2017/0096163 | A1* | 4/2017 | Sakaguchi | B62D 6/02 |
| 2018/0022381 | A1 | 1/2018 | Matsumura et al. | |
| 2018/0339727 | A1* | 11/2018 | Ueyama | B62D 5/0409 |
| 2019/0270480 | A1* | 9/2019 | Harter, Jr. | B62D 5/0463 |

FOREIGN PATENT DOCUMENTS

| | | |
|---|---|---|
| DE | 10 2012 112 767 A1 | 3/2014 |
| EP | 1 142 746 A2 | 10/2001 |
| JP | S63-301174 A | 12/1988 |
| JP | 2006-335250 A | 12/2006 |
| JP | 2008-184049 A | 8/2008 |
| JP | 2014-051263 A | 3/2014 |
| JP | 2014-080061 A | 5/2014 |
| JP | 2014-227042 A | 12/2014 |
| JP | 2016-150644 A | 8/2016 |
| WO | WO-2016/132854 A1 | 8/2016 |

\* cited by examiner

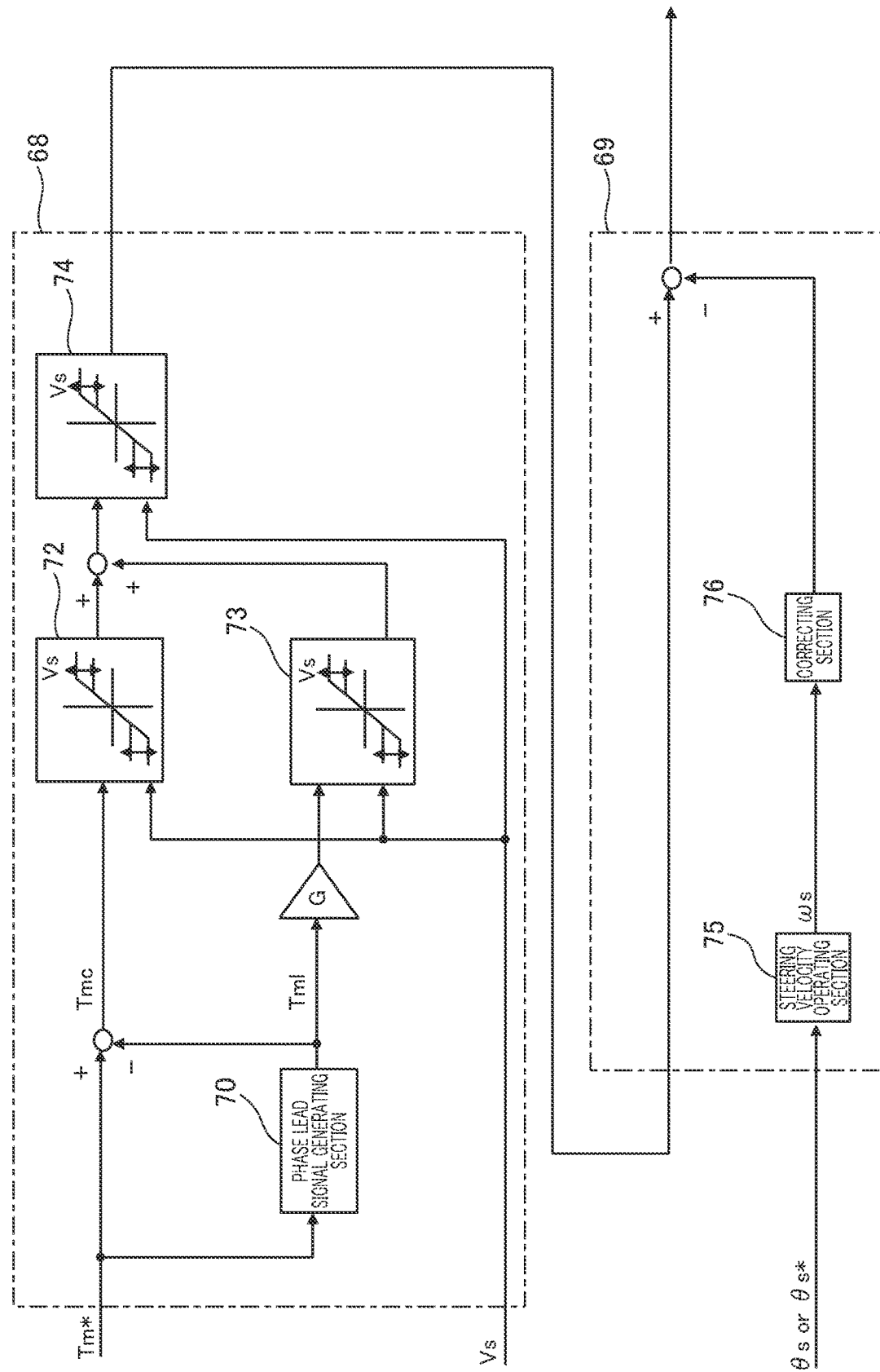

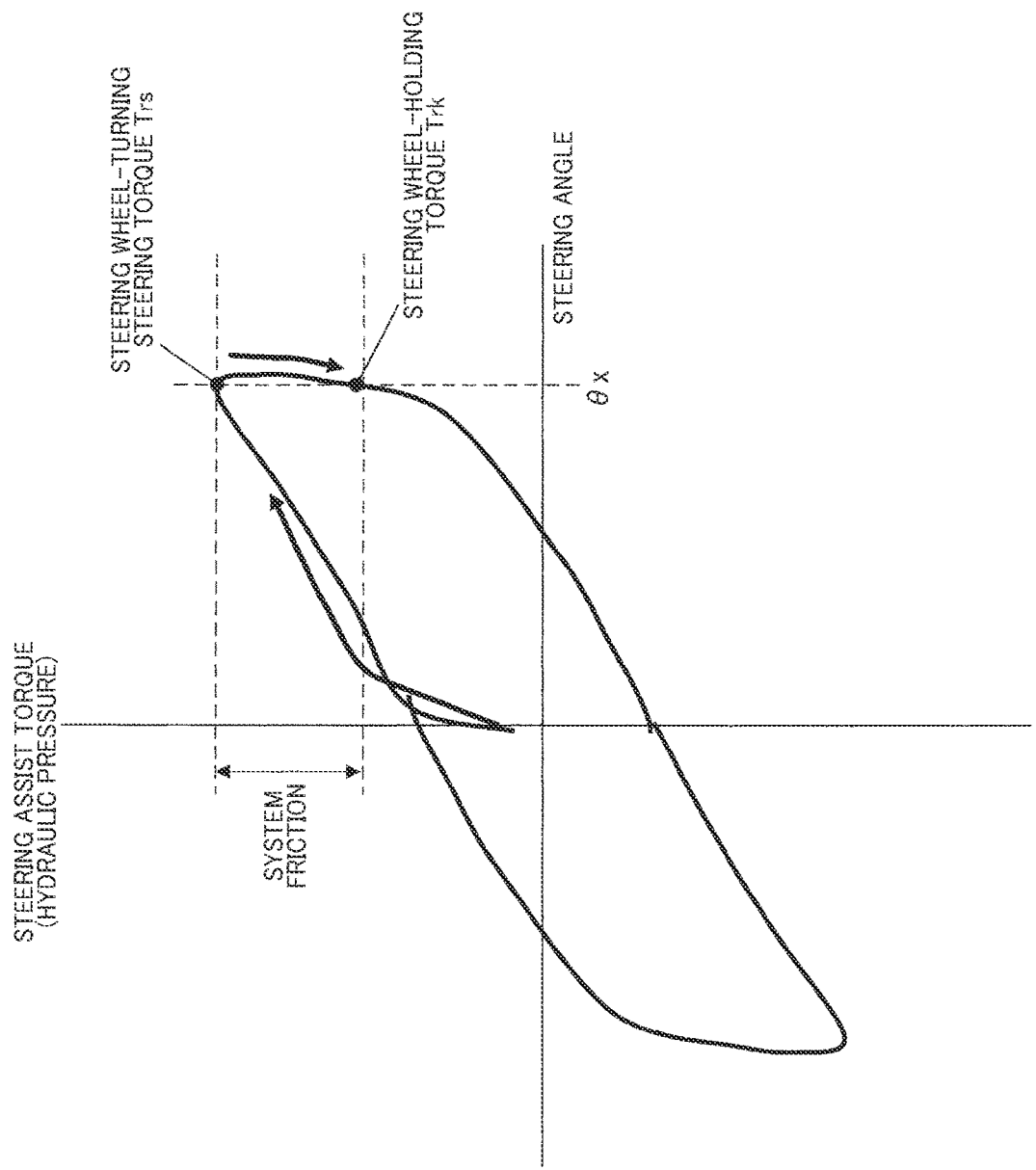

POWER STEERING APPARATUS

TECHNICAL FIELD

The present invention relates to a power steering apparatus (a power steering device).

BACKGROUND ART

As a related art power steering device, there has been known a power steering device disclosed in, for instance, the following Patent Document 1.

This power steering device has two assist functions of electric assist by an electric motor and hydraulic assist by a power cylinder. When a steering effort (or a steering force) inputted to a steering wheel is small, the power steering device assists steering only by the electric motor that is capable of precise control, whereas when the steering effort is large, the power steering device assists the steering by using both of the electric motor and the power cylinder.

CITATION LIST

Patent Document

Patent Document 1: Japanese Unexamined Patent Publication No. JP2008-184049

SUMMARY OF THE INVENTION

Technical Problem

In the related art power steering device, however, since the electric motor operates all the time during steering of the steering wheel, a load imposed on the electric motor becomes large. Because of this, for instance, a large-sized electric motor having high load-tolerance is required, and this consequently increases a physical size of the power steering device greatly.

The present invention was made in view of this problem. An object of the present invention is therefore to provide a power steering device whose physical size can be decreased.

Solution to Problem

According to one aspect of the present invention, a power steering device comprises: a power cylinder providing a steering force to a steering mechanism by being supplied with working fluid; an electric motor providing a steering force to an input shaft of the steering mechanism; and a torque command signal operating section provided in a control unit and configured to calculate a torque command signal for driving and controlling the electric motor and when a vehicle speed is a predetermined vehicle speed or greater, set the torque command signal to 0.

Effects of Invention

According to the present invention, it is possible to decrease the physical size of the power steering device.

BRIEF DESCRIPTION OF THE DRAWINGS

FIG. 5 is a control block diagram showing details of a torque command correction operating section.

FIG. 6 is a drawing showing a hysteresis characteristic of the hydraulic assist mechanism.

FIG. 7A shows the relationship in a case of manual operation. FIG. 7B shows the relationship in a case of automatic operation.

EMBODIMENTS FOR CARRYING OUT THE INVENTION

Embodiments of a power steering device of the present invention will be explained below with reference to the drawings.

First Embodiment

Figure 1:
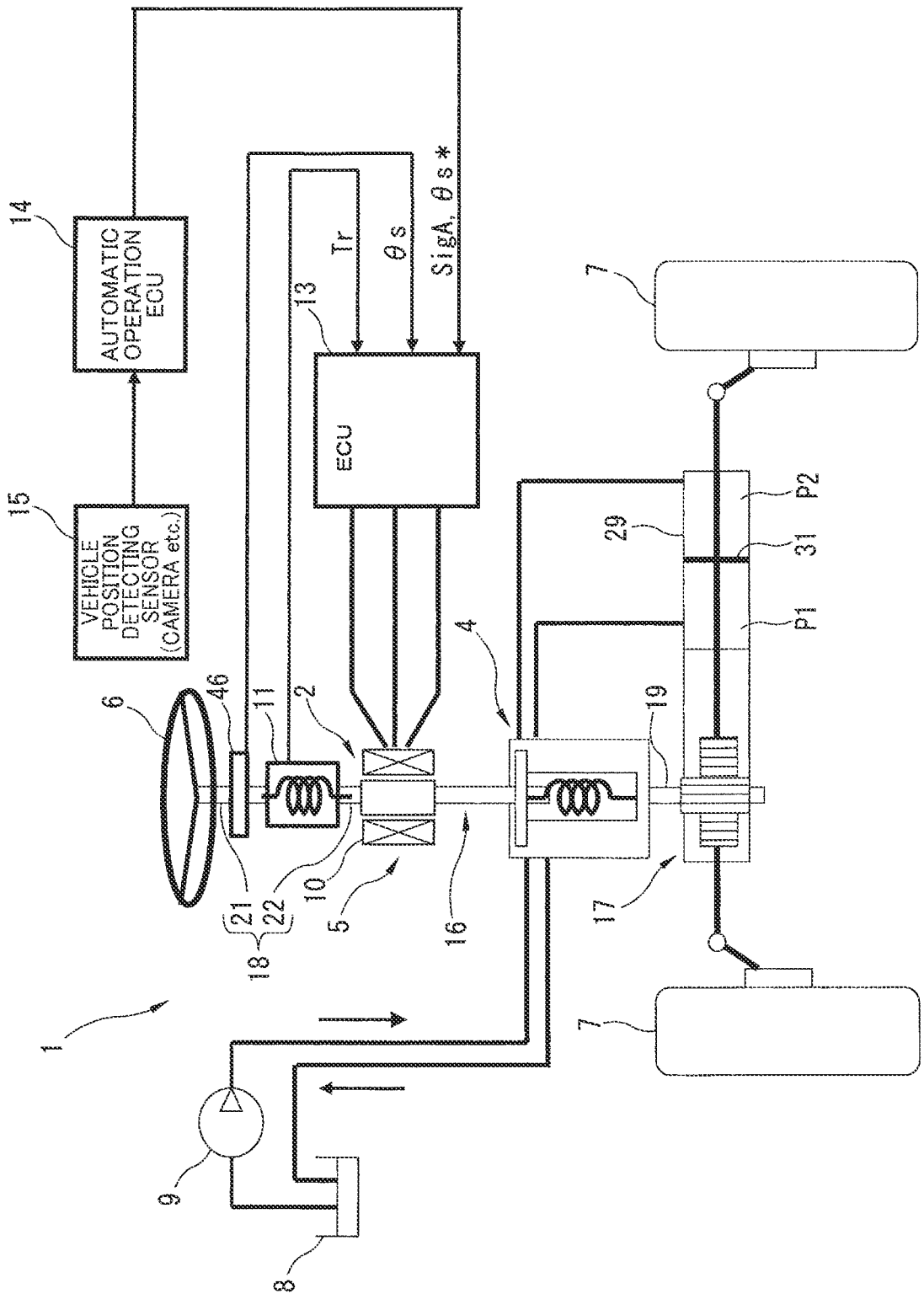
FIG. 1 is a schematic diagram showing a power steering device of the present invention.

FIG. 1 is a schematic diagram showing a power steering device 1 according to a first embodiment of the present invention.

The power steering device 1 is a power steering device having a dual-steering assist function by a hydraulic pressure and a motor torque by mounting an after-mentioned hollow shaft motor 10 as an electric motor to a so-called integral-type hydraulic power steering device.

That is, the power steering device 1 has a steering mechanism 2 that steers steered wheels 7, 7 by and according to a steering operation of a steering wheel 6, a housing 3 (see FIG. 2) that accommodates therein a part of the steering mechanism 2 and a hydraulic assist mechanism 4 and an electric assist mechanism 5 that each provide a steering force to the steering mechanism 2 and assist the steering operation.

The hydraulic assist mechanism 4 is supplied with oil as a working fluid pumped up from a reservoir tank 8 of a vehicle by a pump 9, and provides a steering assist force to the steering mechanism 2 by and according to a hydraulic pressure (an oil pressure) of this oil.

The pump 9 of the present embodiment is configured as an engine-driven pump that is driven by an engine of the vehicle.

On the other hand, the electric assist mechanism 5 is configured by being provided with the hollow shaft motor 10 that generates a rotation driving force, a torque sensor 11 that detects a steering torque Tr inputted to the steering mechanism 2 through a steering wheel 6 by a driver, an after-mentioned first resolver 46 as a steering angle sensor that detects a steering angle θs of the steering wheel 6 and electronic component such as a microcomputer. The electric assist mechanism 5 has a control unit 13 that drives and controls the hollow shaft motor 10 on the basis of a vehicle speed and a detection result obtained by each sensor. The electric assist mechanism 5 is configured to provide the rotation driving force, as the steering assist force, generated by the hollow shaft motor 10 to the steering mechanism 2.

The power steering device 1 further has a function of performing automatic operation when an automatic steering request SigA is outputted from an automatic operation control unit 14 to the control unit 13.

In this case, the control unit 13 controls the hollow shaft motor 10 such that the steering angle θs follows a steering angle command θs* that the automatic operation control unit 14 outputs on the basis of position information etc. obtained from a camera 15 as a vehicle position detecting sensor.

Figure 2:
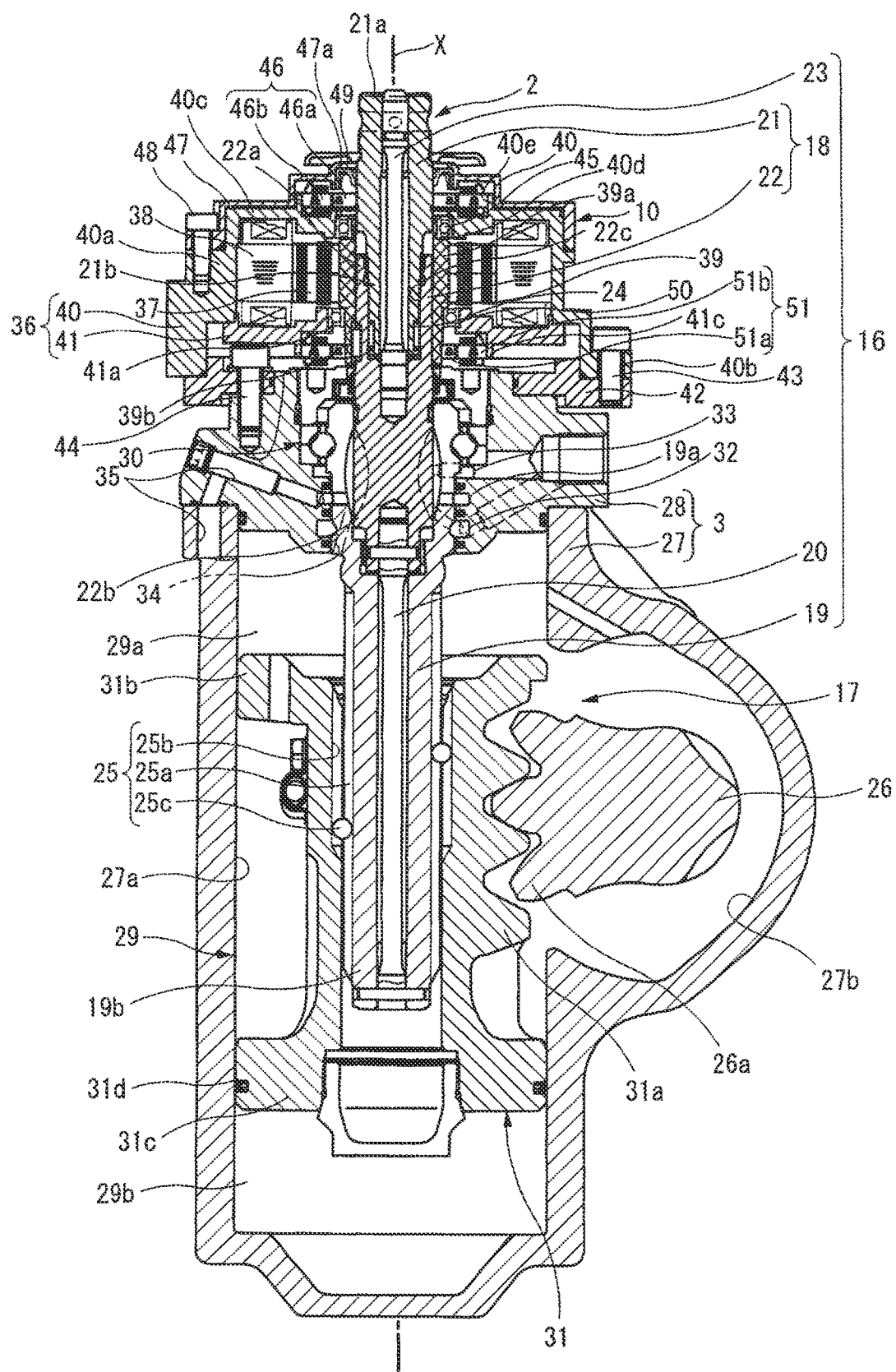
FIG. 2 is a longitudinal cross section of the power steering device.

FIG. 2 is a longitudinal cross section of the power steering device 1.

The steering mechanism 2 has a steering shaft 16 whose one end side protrudes from the housing 3 and is connected to the steering wheel 6 and whose other end is accommodated in the housing 3 and a transmission mechanism 17 which is connected to the other end side of the steering shaft 16 and transmits rotation of the steering shaft 16 to each of the steered wheels 7, 7.

The steering shaft 16 has an input shaft 18 whose one end side is connected to the steering wheel 6 so as to be able to rotate integrally with the steering wheel 6 and an output shaft 19 whose one end side is relatively rotatably connected to the other end side of the input shaft 18 through a first torsion bar 20.

The input shaft 18 is formed by a first input shaft 21 at the one end side which is directly connected to the steering wheel 6 and a second input shaft 22 at the other end side which is relatively rotatably connected to the first input shaft 21 through a second torsion bar 23.

The first input shaft 21 has a hollow shape, and accommodates therein most of the second torsion bar 23. The first input shaft 21 is shaped so that a diameter of the other end portion 21b is smaller than that of one end portion 21a located at the steering wheel 6 side. The other end portion 21b is accommodated in an opening recessed portion 22c formed at one end portion 22a of the second input shaft 22.

A needle bearing 24 is provided between an outer peripheral surface of the other end portion 21b of the first input shaft 21 and an inner peripheral surface of the opening recessed portion 22c of the second input shaft 22. The first input shaft 21 is then rotatably supported by the second input shaft 22 through this needle bearing 24.

The output shaft 19 has a hollow shape, and accommodates therein most of the first torsion bar 20. The output shaft 19 is shaped so that a diameter of one end portion 19a located at the input shaft 18 side is greater than that of the other end side 19b. The other end portion 22b of the second input shaft 22 is accommodated in an inside of the one end portion 19a of the output shaft 19.

The first torsion bar 20 has a function of changing a flow passage and a flow passage cross section of an after-mentioned rotary valve 30 according to a torsion direction and a torsion angle of the first torsion bar 20. On the other hand, the second torsion bar 23 is formed as a torque sensor torsion bar. The torque sensor 11 shown in FIG. 1 detects the steering torque Tr according to a torsion amount of this second torsion bar 23.

The transmission mechanism 17 has a ball screw mechanism 25 that converts the steering force (a rotation force) inputted to the output shaft 19 to a moving force in a rotation axis X direction of the steering shaft 16 and a sector shaft 26 that rotates according to the moving force converted by the ball screw mechanism 25.

The ball screw mechanism 25 has the output shaft 19 as a screw shaft having on an outer periphery thereof a ball groove 25a as a helical groove, a piston 31 as a nut located at the outer periphery side of the output shaft 19 and having on an inner periphery thereof a ball groove 25b corresponding to the ball groove 25a and a plurality of balls 25c accommodated in the both ball grooves 25a and 25b. The piston 31 is provided, on an outer surface thereof which faces to the sector shaft 26, with a teeth portion 31a.

The sector shaft 26 is arranged so as to be substantially orthogonal to the rotation axis X of the steering shaft 16. The sector shaft 26 is provided, on one end portion outer periphery in an axial direction thereof, with a teeth portion 26a that can engage with the teeth portion 31a of the piston 31. Further, a pitman arm (not shown) that is apart of the transmission mechanism is connected to the other end portion of the sector shaft 26.

This pitman arm is structured to change a direction of the both steered wheels 7, 7 by being pulled in a vehicle width direction by and according to rotation of the sector shaft 26.

The housing 3 has a first housing 27 whose one end side located at the steering wheel 6 side is open and a second housing 28 provided so as to close one end opening of the first housing 27 and accommodating therein the after-mentioned rotary valve 30.

The first housing 27 and the second housing 28 are connected together with a plurality of bolts (not shown) arranged at predetermined positions in a circumferential direction with respect to the rotation axis X of the steering shaft 16.

The first housing 27 is formed along the rotation axis X direction of the steering shaft 16. The first housing 27 has a substantially cylindrical cylinder portion 27a that accommodates therein the piston 31 and a shaft accommodation portion 27b which is substantially orthogonal to the cylinder portion 27a and whose one part is formed so as to face to the cylinder portion 27a and which accommodates therein the sector shaft 26.

The hydraulic assist mechanism 4 is provided with a power cylinder 29 formed by the cylinder portion 27a of the first housing 27 and the piston 31 and the rotary valve 30 supplying the oil to first and second hydraulic chambers 29a and 29b that are a pair of hydraulic chambers (described later) of the power cylinder 29.

The piston 31 has a bobbin shape, and one end portion 31b located at a side close to the steering wheel 6 in the rotation axis X direction (i.e. at an upper side in the drawing) of the piston 31 and the other end portion 31c located at a side away from the steering wheel 6 in the rotation axis X direction (i.e. at a lower side in the drawing) of the piston 31 are each formed so as to have an outside diameter that is slightly smaller than an inside diameter of the cylinder portion 27a. With this structure, an attitude of the piston 31 is stably maintained by and in the cylinder portion 27a.

The other end portion 31c of the piston 31 is provided, at an outer periphery thereof, with a ring-shaped seal member 31d. An inside space of the cylinder portion 27a is then divided into the first hydraulic chamber 29a located at the steering wheel 6 side with respect to the seal member 31d and the second hydraulic chamber 29b located at an opposite side to the steering wheel 6 by this seal member 31d. That is, the power cylinder 29 has the first and second hydraulic chambers 29a and 29b divided by the piston 31.

The power cylinder 29 is configured to, when the oil is supplied to the first hydraulic chamber 29a or the second hydraulic chamber 29b, provide a pressure difference between the first and second hydraulic chambers 29a and 29b as the steering assist force to the piston 31 serving as a part of the steering mechanism 2. Here, upon oil supply, the oil in the first hydraulic chamber 29a is introduced into the shaft accommodation portion 27b, and the teeth portions 26a and 31a and gaps between these teeth portions 26a and 31a are lubricated upon oil supply to the first hydraulic chamber 29a.

The rotary valve 30 is configured so that at a neutral position of the steering wheel 6, an introduction port 32 connected to an outlet port of the pump 9 (see FIG. 1) and a discharge port 33 connected to the reservoir tank 8 (see FIG. 1) communicate with each other.

With this configuration, at the neutral, the oil discharged from the pump 9 to the rotary valve 30 is discharged to the reservoir tank 8 without being supplied to any of the first and second hydraulic chambers 29a and 29b.

On the other hand, when the steering wheel 6 is turned, the rotary valve 30 selectively supplies the oil to the first and second hydraulic chambers 29a and 29b according to a relative rotation angle of the output shaft 19 with respect to the second input shaft 22, i.e. the torsion angle of the first torsion bar 20.

That is, the rotary valve 30 is configured so that when the steering wheel 6 is steered to an arbitrary one direction, the introduction port 32 communicates with the first hydraulic chamber 29a through a first supply and discharge passage 34, and the discharge port 33 communicates with the second hydraulic chamber 29b through a second supply and discharge passage 35. As a result, the first hydraulic chamber 29a is supplied with the oil, whereas the oil is discharged from the second hydraulic chamber 29b.

On the other hand, the rotary valve 30 is configured so that when the steering wheel 6 is steered to the other direction, the introduction port 32 communicates with the second hydraulic chamber 29b through the second supply and discharge passage 35, and the discharge port 33 communicates with the first hydraulic chamber 29a through the first supply and discharge passage 34. As a result, the second hydraulic chamber 29b is supplied with the oil, whereas the oil is discharged from the first hydraulic chamber 29a.

Here, upon supply and discharge of the oil to and from the first and second hydraulic chambers 29a and 29b, each of an oil supply amount and an oil discharge amount is set so that as a relative rotation difference between the output shaft 19 and the second input shaft 22 is greater, the oil supply amount and the oil discharge amount each increase. In other words, as the torsion angle of the first torsion bar 20 becomes greater, the oil supply amount and the oil discharge amount each increase.

The hollow shaft motor 10 is a so-called three-phase AC brushless motor. The hollow shaft motor 10 has motor elements provided at an outer peripheral side of the second input shaft 22 protruding from the housing 3 and a motor housing 36 accommodating therein the motor elements.

The motor elements includes a cylindrical motor rotor 37 that is fixed to the second input shaft 22 through a connecting member 39 so as to rotate integrally with the second input shaft 22 and a cylindrical motor stator 38 arranged at an outer circumferential side of the motor rotor 37 with a predetermined gap between the motor rotor 37 and the motor stator 38.

The motor housing 36 has an upper-closed cylindrical first motor housing forming portion 40 that is open toward the housing 3 side and accommodates therein the motor elements and a disc-shaped second motor housing forming portion 41 that closes an opening of the first motor housing forming portion 40. These first and second motor housing forming portions 40 and 41 are made of a certain metal such as aluminium alloy.

The first motor housing forming portion 40 is shaped so that an inside diameter of a cylindrical portion 40a of the first motor housing forming portion 40 is substantially the same as an outside diameter of the motor stator 38. The motor stator 38 is fixed to an inner circumferential side of the cylindrical portion 40a by press-fitting or shrinkage fitting.

The first motor housing forming portion 40 has a flange portion 40b at an outer circumferential side of the opening. This flange portion 40b is connected and fixed to a disc-shaped adapter member 42 with a bolt(s) 43.

The adapter member 42 is connected and fixed to the second housing 28 of the housing 3 with a bolt(s) 44. Therefore, the first motor housing forming portion 40 is fixed to the second housing 28 through the adapter member 42.

A lid portion 40c of the first motor housing forming portion 40 is provided with an insertion hole 40d into which the steering shaft 16 is inserted. One end portion 39a, located at the steering wheel 6 side, of the connecting member 39 is located at an inner peripheral side of the insertion hole 40d. Between an outer peripheral surface of this one end portion 39a and an inner peripheral surface of the insertion hole 40d, a first ball bearing 45 is provided.

The first motor housing forming portion 40 rotatably supports the one end portion 39a of the connecting member 39 through this first ball bearing 45.

The lid portion 40c is provided, at an end surface located at the steering wheel 6 side thereof, with a recessed portion 40e having a circular recess. The first resolver 46 is disposed in this recessed portion 40e.

The first resolver 46 has a ring-shaped resolver rotor 46a fixed to an outer periphery of the first input shaft 21 so as to be able to rotate integrally with the first input shaft 21 and a ring-shaped resolver stator 46b whose outer periphery is fixed to an inner periphery of the recessed portion 40e. A rotation position of the resolver rotor 46a is detected by the resolver stator 46b, thereby detecting a rotation angle of the first input shaft 21, i.e. the steering angle θs of the steering wheel 6.

The first resolver 46 is covered with a cover member 47. The cover member 47 is connected and fixed to the first motor housing forming portion 40 with a bolt(s) 48.

The cover member 47 is provided, at an axial center position thereof, with an insertion hole 47a into which the first input shaft 21 is inserted. Between the insertion hole 47a and the first input shaft 21, a seal member 49 to seal a gap between these insertion hole 47a and the first input shaft 21 is provided.

The second motor housing forming portion 41 is provided, at an axial center position thereof, with an insertion hole 41a into which the connecting shaft 16 is inserted. The other end portion 39b of the connecting member 39 is located at an inner peripheral side of the insertion hole 41a. Between an outer peripheral surface of this other end portion 39b and an inner peripheral surface of the insertion hole 41a, a second ball bearing 50 is provided. The second motor housing forming portion 41 rotatably supports the other end portion 39b of the connecting member 39 through this second ball bearing 50.

The second motor housing forming portion 41 is provided, at an end surface located at the housing 3 side thereof, with a recessed portion 41c having a circular recess. A second resolver 51 is disposed in this recessed portion 41c.

The second resolver 51 has a ring-shaped resolver rotor 51a fixed to an outer periphery of the second input shaft 22 through the connecting member 39 so as to be able to rotate integrally with the second input shaft 22 and a ring-shaped resolver stator 51b whose outer periphery is fixed to an inner periphery of the recessed portion 41c. A rotation position of the resolver rotor 51a is detected by the resolver stator 51b, thereby detecting a rotation angle of the second input shaft 22.

Here, the rotation angle of the second input shaft 22 is the same as a rotation angle of the motor rotor 37 of the hollow shaft motor 10. Therefore, the second resolver 51 also serves as a motor rotation angle sensor that detects a motor rotation angle that is the rotation angle of the motor rotor 37.

Figure 3:
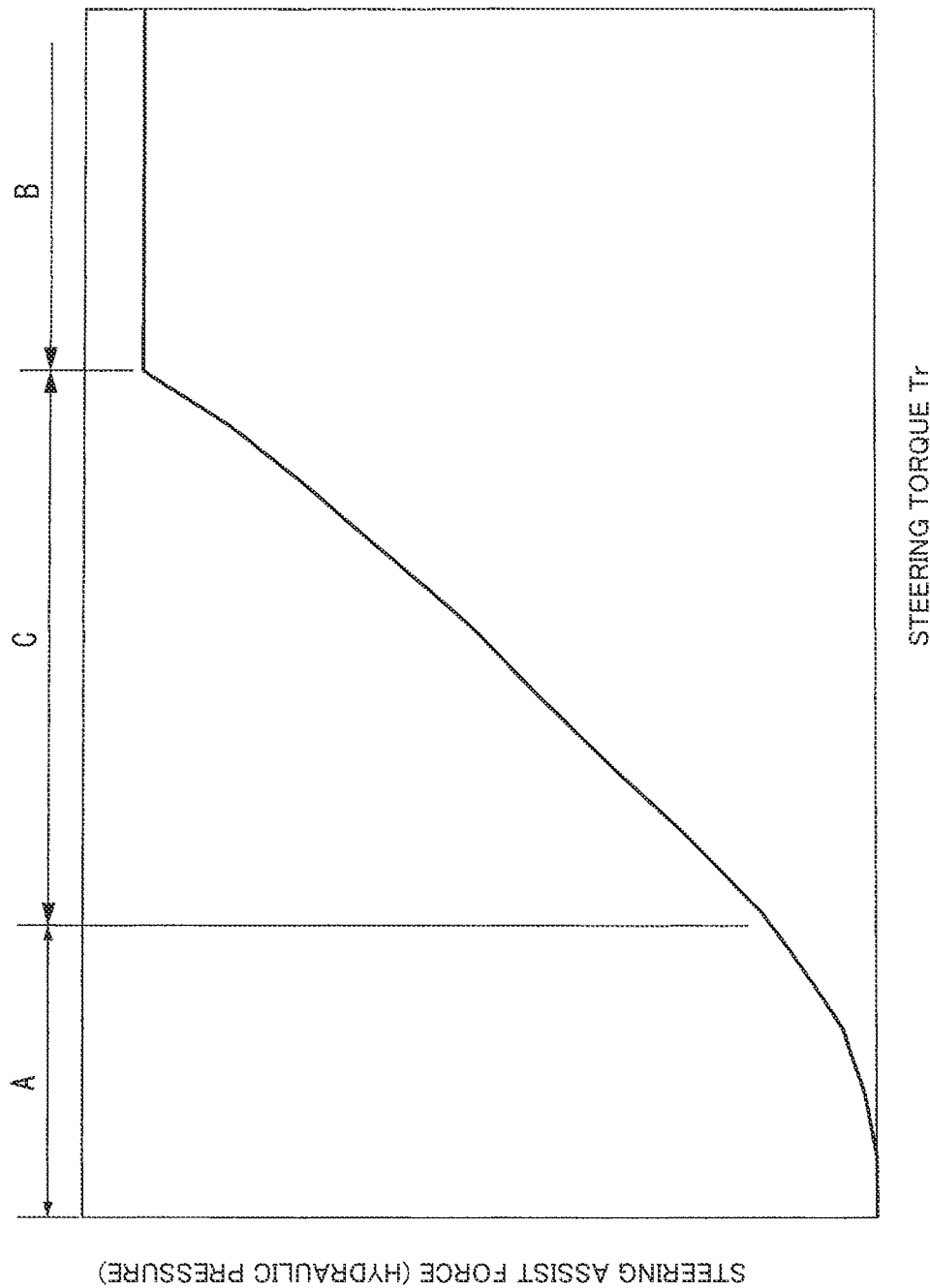
FIG. 3 is a drawing showing an assist characteristic when providing a steering force to a steering mechanism by a hydraulic assist mechanism.

FIG. 3 is a drawing showing an steering assist force providing characteristic by the hydraulic assist mechanism 4.

The hydraulic assist mechanism 4 is configured to have a characteristic that can assist the steering of the driver without any problems even by itself, i.e. without the steering assist force by the electric assist mechanisms. That is, the steering assist force provided to the steering mechanism 2 at manual operation is basically covered with the hydraulic assist mechanism 4.

Further, the hydraulic assist mechanism 4 is configured to suppress the steering assist force outputted from the hydraulic assist mechanism 4 in a region A where the steering torque Tr is small, in order that the steering does not falter by an excessive steering assist force during travel at middle or high speed.

On the other hand, the hydraulic assist mechanism 4 is configured to, in a region B where the steering torque Tr is large, output the steering assist force that can turn the steering mechanism 2 to a stroke end when static steering of the steering wheel 6 is carried out.

Here, this steering torque Tr when the hydraulic assist mechanism 4 outputs the steering assist force that can turn the steering mechanism 2 to the stroke end is set so as to fall below a motor torque upper limit value that can be outputted by the hollow shaft motor 10. That is, the characteristic is set so that at the automatic operation in which the steering torque Tr inputted by the driver is 0, the steering assist force that can turn the steering mechanism 2 to the stroke end can be derived or obtained by only an output of the hollow shaft motor 10.

Further, the characteristic is set so as to have a linear characteristic in a region C between the region A and the region B with consideration given to a controllability when performing a cooperative control with the electric assist mechanism 5.

The above characteristic is set to be constant all the time (i.e. remain unchanged) regardless of an operating condition such as the vehicle speed Vs. That is, the steering assist force by the power cylinder 29 for the steering torque Tr has a single characteristic (or an individual characteristic) regardless of a change such as the vehicle speed Vs.

Figure 4:
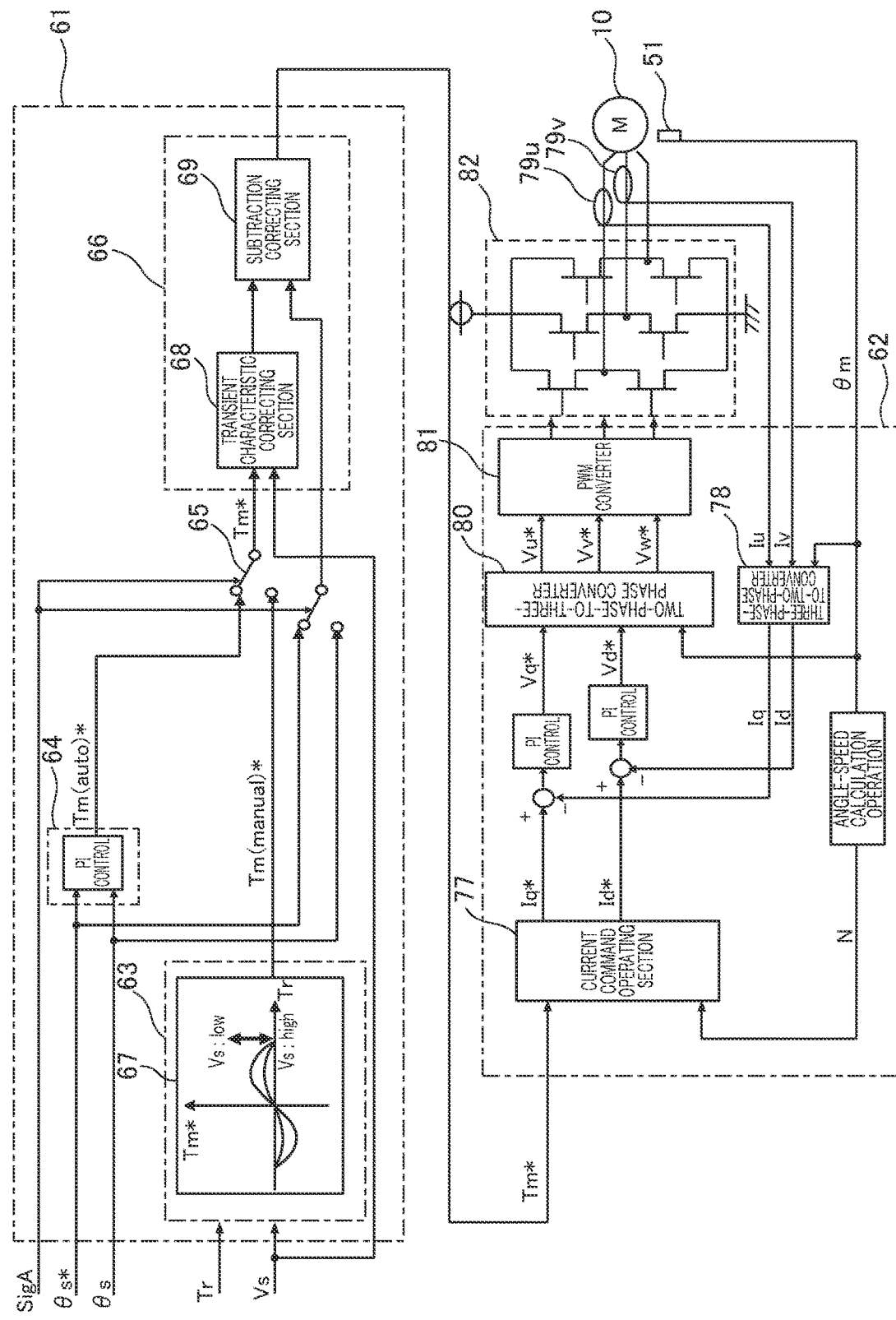
FIG. 4 is a control block diagram showing a configuration of an operating circuit of a control unit.

FIG. 4 is a control block diagram showing a configuration of an operating circuit of the control unit 13.

The control unit 13 has a torque command signal operating section 61 that operates or calculates a torque command signal Tm* on the basis of each operating information and a motor controlling section 62 that drives and controls the hollow shaft motor 10 on the basis of the torque command signal Tm* calculated by the torque command signal operating section 61.

The torque command signal operating section 61 has a manual operation torque command operating section 63 that calculates a manual operation torque command signal Tm(manual)* that is a torque command signal Tm* when performing the manual operation, an automatic operation torque command operating section 64 that calculates an automatic operation torque command signal Tm(auto)* that is a torque command signal Tm* when performing the automatic operation, a torque command switching section 65 that selects either one of the manual operation torque command signal Tm(manual)* or the automatic operation torque command signal Tm(auto)* as the torque command signal Tm* for the control and a torque command correction operating section 66 that properly corrects the torque command signal Tm* inputted through the torque command switching section 65 on the basis of the operating condition.

Here, for the sake of convenience, in the following, the manual operation torque command signal Tm(manual)* is simply called "torque command signal Tm(manual)*", and the automatic operation torque command signal Tm(auto)* is simply called "torque command signal Tm(auto)*".

The manual operation torque command operating section 63 is configured to calculate the torque command signal Tm(manual)* on the basis of the steering torque Tr detected by the torque sensor 11 and the vehicle speed Vs detected by a vehicle speed sensor installed at a differential gear (not shown) etc.

More specifically, when inputting the steering torque Tr and the vehicle speed Vs, the manual operation torque command operating section 63 calculates the torque command signal Tm (manual)* by a torque command calculation map 67 based on these sensor information.

The torque command calculation map 67 has a quadric curve output characteristic showing that in a region where the steering torque Tr is extremely small and a region where the steering torque Tr becomes large when carrying out the static steering, basically, a small torque command signal Tm(manual)* is outputted, and in a middle region except these regions, a large torque command signal Tm(manual)* is outputted.

Further, the torque command calculation map 67 is set so that as the vehicle speed Vs increases, the outputted torque command signal Tm(manual)* decreases.

Especially when the vehicle speed Vs is a predetermined middle or high speed or greater, the outputted torque command signal Tm(manual)* is set to 0 regardless of a magnitude of the steering torque Tr. That is, when the vehicle speed Vs is the predetermined value or greater, basically, the steering assist by the hollow shaft motor 10 is not performed, but the steering is assisted only by the steering assist force outputted by the hydraulic assist mechanism 4.

The automatic operation torque command operating section 64 is configured to calculate the torque command signal Tm(auto)* required for the steering angle θs to follow the steering angle command θs* outputted by the automatic operation control unit 14 by a PI control.

The torque command switching section 65 is configured to output the torque command signal Tm(auto)* as the torque command signal Tm* to the torque command correction operating section 66 when the automatic steering request SigA is outputted from the automatic operation control unit 14 to the control unit 13.

On the other hand, the torque command switching section 65 outputs the torque command signal Tm(manual)* as the torque command signal Tm* to the following torque command correction operating section 66 when the automatic steering request SigA is not outputted.

The torque command correction operating section 66 has a transient characteristic correcting section 68 configured to compensate or correct a response delay of the steering assist and a subtraction correcting section 69 configured to subtraction-correct the torque command signal Tm* when the steering wheel 6 is steered gently.

The transient characteristic correcting section 68 compensates the response delay of the steering assist, which is typical of the hydraulic assist mechanism 4, by increase-correcting the torque command signal Tm* by the electric assist mechanism 5 side.

The steering assist force by the hydraulic assist mechanism 4 is provided to the steering mechanism 2 only after the first torsion bar 20 twists (torsion occurs at the first torsion bar 20) when the steering wheel 6 is steered then an amount of the oil corresponding to this torsion angle of the first torsion bar 20 is supplied to the first hydraulic chamber 29a or the second hydraulic chamber 29b.

That is, providing of the steering assist force by the hydraulic assist mechanism 4 is necessarily delayed in driver's steering operation of the steering wheel 6 due to a mechanical structure of the hydraulic assist mechanism 4. This delay of the steering assist force by the hydraulic assist mechanism 4 occurs also when making the steering angle θs follow the steering angle command θs* during the automatic operation.

In light of these points, in order to compensate the assist delay of the hydraulic assist mechanism 4, as shown in FIG. 5, in the transient characteristic correcting section 68, first, a phase lead signal Tml that is a signal obtained by advancing a phase of the torque command signal Tm* is generated by a phase lead signal generating section 70. Here, this phase lead signal generating section 70 is a high-pass filter as a digital filter provided in the microcomputer in the control unit 13, and extracts or outputs the phase lead signal Tml from the torque command signal Tm*.

The high-pass filter used as the phase lead signal generating section 70 could be a section formed by electronic circuits on a substrate or a circuit board in the control unit 13, other than the digital filter.

When the phase lead signal generating section 70 generates the phase lead signal Tml in this manner, the transient characteristic correcting section 68 subsequently calculates a torque command steady signal Tmc by subtracting the phase lead signal Tml from the torque command signal Tm*. Then, by adding a signal obtained by multiplying the phase lead signal Tml by a correction factor G to this torque command steady signal Tmc, a torque command signal (a motor command signal) Tm* having undergone the compensation of response delay is generated.

Here, at this time, regarding the torque command steady signal Tmc, an upper limit value is provided by a torque command signal limiter section 72. On the other hand, as for the signal obtained by multiplying the phase lead signal Tml by the correction factor G, an upper limit value is provided by a phase lead signal limiter section 73.

The torque command signal limiter section 72 is configured to variably control the upper limit value for the torque command steady signal Tmc according to the vehicle speed Vs. More specifically, it is set so that the higher the vehicle speed Vs is, the lower the upper limit value is.

On the other hand, the phase lead signal limiter section 73 is configured to variably control the upper limit value for the phase lead signal Tml according to the vehicle speed Vs. More specifically, it is set so that the higher the vehicle speed Vs is, the lower the upper limit value is.

Further, both of the limiter sections 72 and 73 are each configured so that the upper limit value for the phase lead signal Tml is equal to or greater than the upper limit value for the torque command steady signal Tmc.

The transient characteristic correcting section 68 further has a motor command signal limiter section 74 configured to provide an upper limit value to the torque command signal (the motor command signal) Tm* having undergone the compensation of response delay. In the same manner as the limiter sections 72 and 73, the motor command signal limiter section 74 is also configured to variably control the upper limit value of the torque command signal (the motor command signal) Tm* according to the vehicle speed Vs. More specifically, it is set so that the higher the vehicle speed Vs is, the lower the upper limit value is.

As shown in FIG. 5, the subtraction correcting section 69 has a steering velocity operating section 75 configured to calculate a steering velocity ωs by differentiating the steering angle θs at the manual operation or the steering angle command θs* at the automatic operation with respect to time and a correcting section 76 that functions as a steering velocity signal receiving section that receives the steering velocity ωs calculated by the steering velocity operating section 75 and corrects the torque command signal Tm* according to the steering velocity ωs.

The correcting section 76 is configured to, when a rate of increase of the steering velocity ωs calculated by the steering velocity operating section 75 is less than a predetermined value, properly subtraction-correct the torque command signal Tm* so that the steering force provided to the steering mechanism 2 by the hollow shaft motor 10 is smaller than the steering force provided to the steering mechanism 2 by the power cylinder 29.

The motor controlling section 62 is configured to, as shown in FIG. 4, first, by a current command operating section 77, operate or calculate a d-axis current command Id* and a q-axis current command Iq* from the torque command signal Tm* and a motor rotation speed N calculated on the basis of a motor rotation angle θm detected by the second resolver 51.

Next, by a three-phase-to-two-phase converter 78, the motor controlling section 62 obtains a d-axis current Id and a q-axis current Iq from a u-phase current Iu and a v-phase current Iv outputted by current sensors 79u and 79v that are set at the hollow shaft motor 10 and the motor rotation angle θm.

Subsequently, the motor controlling section 62 calculates values required for the d-axis current Id and the q-axis current Iq to follow the d-axis current command Id* and a q-axis current command Iq* respectively, and calculates a d-axis voltage command Vd* and a q-axis voltage command Vq* on the basis of these calculated values That is, by each calculating a difference between the d-axis current command Id* and the d-axis current Id and a difference between the q-axis current command Iq* and the q-axis current Iq, the d-axis voltage command Vd* and the q-axis voltage command Vq* are obtained from these differences by respective PI controls.

After calculating the d-axis voltage command Vd* and the q-axis voltage command Vq*, by a two-phase-to-three-phase converter 80, the motor controlling section 62 calculates a u-phase voltage command Vu*, a v-phase voltage command Vv* and a w-phase voltage command Vw* from the d-axis voltage command Vd* and the q-axis voltage command Vq* and the motor rotation angle θm. After converting these voltage commands Vu*, Vv* and Vw* from analog waveform to PWM waveform by a PWM converter 81, these voltage commands Vu*, Vv* and Vw* are outputted to an inverter circuit 82 provided in the control unit 13, then the hollow shaft motor 10 is driven and controlled through this inverter circuit 82.

Working and Effect of the Present Embodiment

As mentioned above, in the related art power steering device, since the electric motor operates all the time during steering of the steering wheel, a load imposed on the electric motor necessarily becomes large. Because of this, the related art power steering device has to employ a large-sized electric motor that is capable of resisting the large load, and this consequently results in increase in a physical size of the power steering device.

Here, if a motor cooling unit such as a radiating fin for suppressing increase in temperature of the electric motor, which is caused by the large load, is provided to the electric motor, a small-sized electric motor could be used.

In this case, however, since the size of the power steering device increases by this motor cooling unit, the problem of increasing the size of the power steering device still remains without being solved.

In contrast to this, in the present embodiment, at the manual operation, when the vehicle speed Vs is the predetermined middle or high speed or greater, all of the steering assist force is covered with the hydraulic assist mechanism 4, and the steering assist by the hollow shaft motor 10 is not performed.

That is, when the operation is the manual operation and the vehicle speed Vs is the predetermined middle or high speed or greater, the control is configured so that the torque command signal Tm(manual)* outputted by the manual operation torque command operating section 63 is 0.

With this, since a load imposed on the hollow shaft motor 10 when the vehicle speed Vs is the predetermined middle or high speed or greater is 0, the load imposed on the hollow shaft motor 10 at the manual operation can be reduced. As a consequence, a small-sized electric motor can be used as the hollow shaft motor 10, and this results in reduction in the physical size of the power steering device 1.

Further, in the present embodiment, when the vehicle speed Vs is less than the predetermined middle or high speed, the control is configured so that as the vehicle speed Vs increases, the steering assist force outputted by the hollow shaft motor 10 decreases. This configuration also brings about the effect of reducing the load imposed on the hollow shaft motor 10.

Moreover, in the present embodiment, the phase lead signal generating section 70 is provided in the control unit 13, and by this phase lead signal generating section 70, the torque command signal Tm* is increase-corrected. With this, it is possible to compensate the response delay of the steering assist, which is typical of the hydraulic assist mechanism 4, by the electric assist mechanism 5 side.

Consequently, at the manual operation, since it is possible to provide the steering force with rapid response to the driver's steering operation, a steering feeling can be improved. In addition, at the automatic operation, a following performance of the steering angle θs to the steering angle command θs* especially when starting to turn the steering wheel can be improved.

In the present embodiment, the phase lead signal generating section 70 is formed by the high-pass filter. It is therefore possible to readily generate the phase lead signal Tml.

In the present embodiment, although the filter used as the phase lead signal generating section 70 is the high-pass filter, a band-pass filter that is capable of cancelling unnecessary higher harmonics could be used. Further, in the present embodiment, the phase lead signal Tml is generated by advancing the phase of the torque command signal Tm*. However, instead of this manner, the phase lead signal Tml could be generated by advancing a phase of the steering torque Tr.

Here, when compensating the response delay of the hydraulic assist mechanism 4 by the transient characteristic correcting section 68, if an excessive steering force is provided to the steering mechanism 2 from the hollow shaft motor 10, there may be a risk that the driver will be subject to an odd or awkward feeling upon steering.

Therefore, in the present embodiment, the transient characteristic correcting section 68 is provided with the torque command signal limiter section 72 and the phase lead signal limiter section 73, and by these limiter sections 72 and 73, an excessive increase of the torque command signal Tm* is suppressed. It is therefore possible to prevent an excessive steering force from being provided from the hollow shaft motor 10, thereby improving the steering feeling.

Further, when limiting the torque command signal Tm* by the limiter sections 72 and 73, if the phase lead signal Tml is excessively limited by the phase lead signal limiter section 73, there may be a risk that the response delay of the hydraulic assist mechanism 4 cannot be properly compensated.

Therefore, in the present embodiment, a magnitude of the upper limit value of the phase lead signal limiter section 73 is set to be equal to or greater than the upper limit value of the torque command signal limiter section 72. With this setting, since the phase lead signal Tml is greatly reflected to or greatly affects the torque command signal Tm*, a response to the steering operation can be improved.

In the present embodiment, the torque command signal limiter section 72 and the phase lead signal limiter section 73 are configured to variably control the respective upper limit values according to the vehicle speed Vs. With these configurations, by lowering each of the upper limit values, for instance, at a high speed travel which does not require the providing of a large steering force, an excessive steering force can be prevented from being provided to the steering mechanism 2. That is, it is possible to properly provide the steering force according to the vehicle speed Vs.

Further, in the present embodiment, the transient characteristic correcting section 68 is further provided with the motor command signal limiter section 74. With this, even in a case where despite the fact that the torque command steady signal Tmc and the phase lead signal Tml are limited respectively, the torque command signal (the motor command signal) Tm* having undergone the compensation of response delay, which is the sum of these limited signals Tmc and Tml, becomes excessively large, this torque command signal Tm* can be limited. Consequently, an excessive steering force can be surely prevented from being provided from the hollow shaft motor 10 to the steering mechanism 2.

Also, in the present embodiment, the motor command signal limiter section 74 is configured to variably control the upper limit value according to the vehicle speed Vs. It is thus possible to provide the steering force according to the vehicle speed Vs more properly.

Here, in the present embodiment, the three limiter sections 72 to 74 are provided in the transient characteristic correcting section 68. However, it is possible to arbitrarily determine whether all the limiter sections 72 to 74 are provided or a part of these limiter sections 72 to 74 is removed. Further, it is possible to arbitrarily determine whether the respective upper limit values of the limiter sections 72 to 74 are set to be variably controlled according to the vehicle speed Vs.

In the present embodiment, the subtraction correcting section 69 is configured to, when the rate of increase of the steering velocity ωs is less than the predetermined value, correct the torque command signal Tm* so that the steering force provided to the steering mechanism 2 by the hollow shaft motor 10 is smaller than the steering force provided to the steering mechanism 2 by the power cylinder 29. With this, a load imposed on the hollow shaft motor 10 when performing gentle steering operation which does not require quick response can be reduced.

In the present embodiment, the steering force provided to the steering mechanism 2 by the power cylinder 29 for the steering torque Tr inputted to the steering wheel 6 has the single characteristic (or the individual characteristic) regardless of the change of the vehicle speed Vs. With this, providing the steering force by the hydraulic pressure can be realized by a simple configuration. Further, since the providing the steering force by the hydraulic pressure is performed with the single characteristic (or the individual characteristic), it is possible to easily perform the cooperative control between the hydraulic assist mechanism 4 and the electric assist mechanism 5.

Second Embodiment

In a second embodiment of the present invention, the torque command signal operating section 61 is configured to calculate the torque command signal Tm* with consideration given to a steering wheel-holding state in which the steering wheel 6 is held at a turned state.

In the present embodiment (also, in the following each embodiment), the same element or component as that of the first embodiment is denoted by the same reference sign, and its explanation will be omitted.

As shown in FIG. 6, it is generally known that when performing the steering assist by the hydraulic assist mechanism 4, a steering wheel-holding torque Trk required to hold the steering wheel 6 at a predetermined steering angle θx is smaller than a steering wheel-turning steering torque Trs required to turn the steering wheel 6 up to the predetermined steering angle θx.

That is, a phenomenon in which when performing the steering assist by the power cylinder 29, a difference (a hysteresis) occurs between a variation when the steering torque Tr increases and a variation when the steering torque Tr decreases is generally known. This hysteresis is caused by a system friction etc. of the hydraulic assist mechanism 4.

Figure 7A:
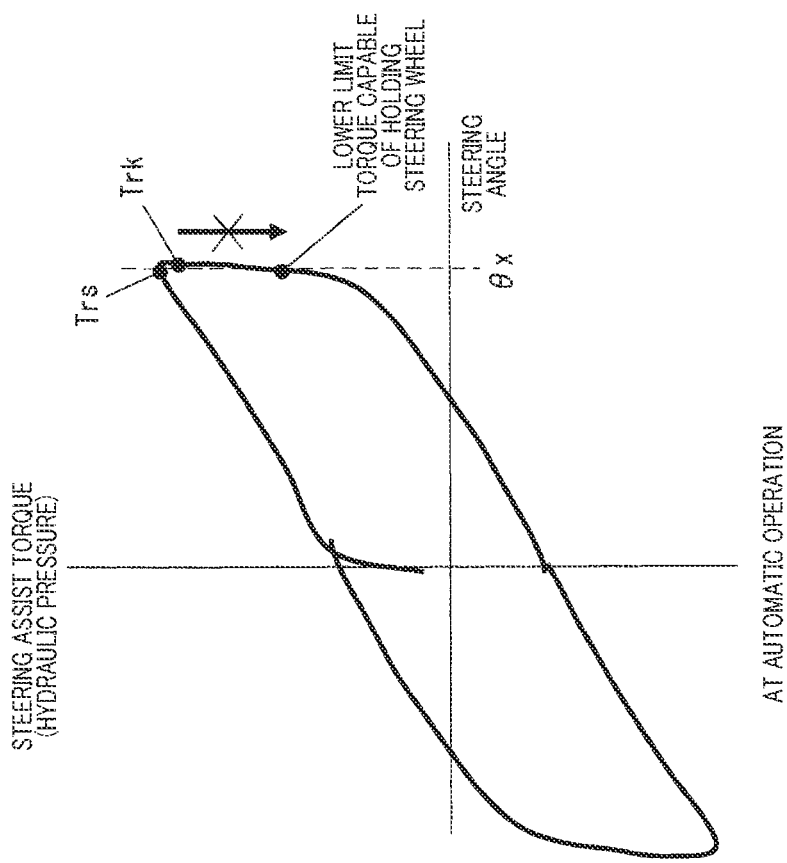
FIGS. 7A and 7B are drawings showing a relationship between a steering wheel-turning steering torque (a torque when turning the steering wheel) and a steering wheel-holding torque (a torque when holding the steering wheel).

Because of this, at the manual operation, if the motor assist by the electric assist mechanism 5 is performed without differentiating the steering wheel-turning and the steering wheel-holding, as shown in FIG. 7A, the steering wheel-holding torque Trk becomes excessively small upon steering wheel-holding, and thus the driver is subject to an odd or awkward feeling upon steering.

Figure 7B:
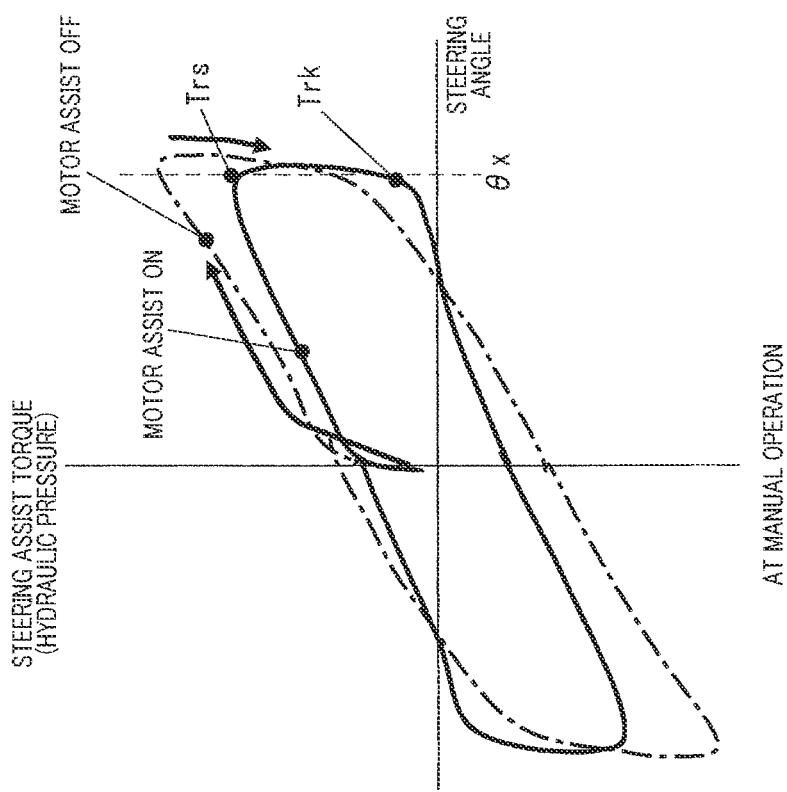

Further, at the automatic operation, if the hollow shaft motor 10 is merely controlled so that the steering angle θs follows the steering angle command θs*, as shown in FIG. 7B, the torque is maintained at a high torque state without differentiating the steering wheel-turning and the steering wheel-holding, and thus an unnecessary redundant torque occurs upon steering wheel-holding.

Figure 8:
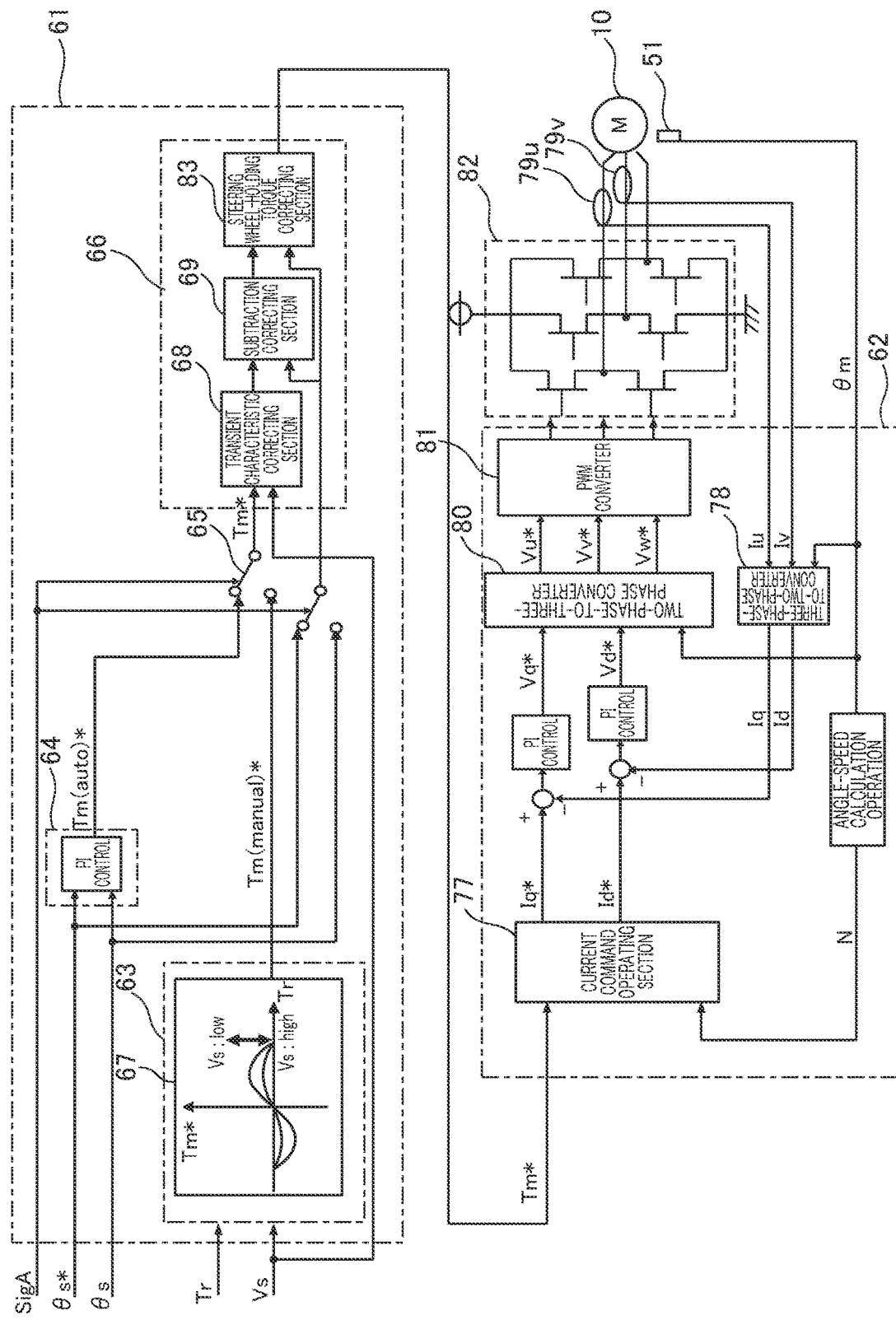
FIG. 8 is a control block diagram showing a configuration of an operating circuit of a control unit according to a second embodiment.

Therefore, in the present embodiment, as shown in FIG. 8, in addition to the configuration of the first embodiment, the torque command correction operating section 66 is provided with a steering wheel-holding torque correcting section 83 configured to, when the steering wheel 6 is in the steering wheel-holding state, decrease-correct the torque command signal Tm*.

Figure 9:
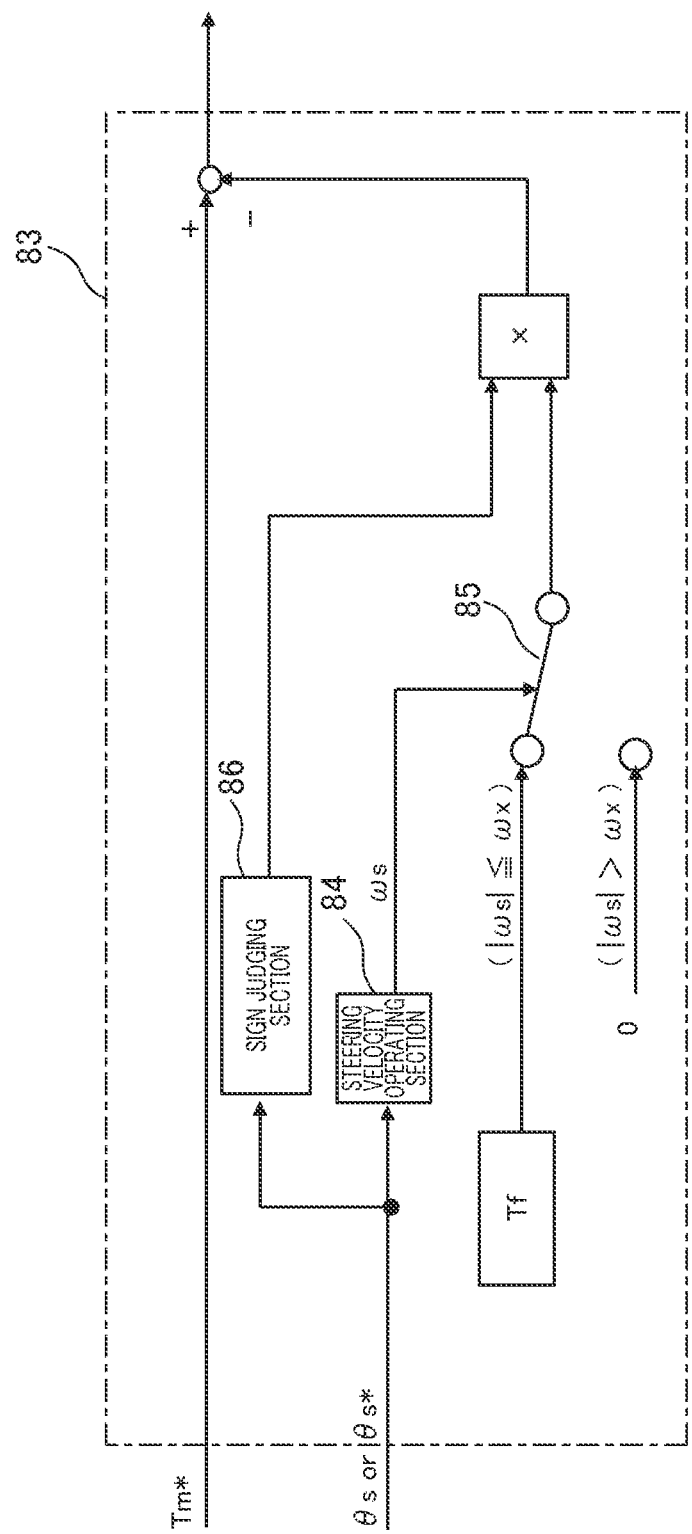
FIG. 9 is a diagram showing details of control of a steering wheel-holding torque correcting section of the second embodiment.

More specifically, as shown in FIG. 9, first, the steering wheel-holding torque correcting section 83 calculates a steering velocity ωs, by a steering velocity operating section 84, by differentiating the steering angle θs at the manual operation or the steering angle command θs* at the automatic operation with respect to time.

Subsequently, the steering wheel-holding torque correcting section 83 judges whether or not an absolute value |ωs| of the steering velocity ωs is equal to or less than a predetermined value ωx, by a switch judging section 85.

When judged that the absolute value |ωs| of the steering velocity ωs is greater than the predetermined value ωx, namely, when judged that the steering wheel 6 is in a steering state, the steering wheel-holding torque correcting section 83 does not perform the correction of the torque command signal Tm*.

On the other hand, when judged that the absolute value |ωs| of the steering velocity ωs is equal to or less than the predetermined value ωx, namely, when judged that the steering wheel 6 is in the steering wheel-holding state, after adding a proper sign derived from the steering angle θs (the steering angle command θs*) by a sign judging section 86 to a previously stored steering wheel-holding offset torque Tf, by subtracting the steering wheel-holding offset torque Tf from the torque command signal Tm*, the torque command signal Tm* is decrease-corrected.

The steering wheel-holding offset torque Tf used for the subtraction of the torque command signal Tm* is a fixed value determined on the basis of a hysteresis characteristic of the hydraulic assist mechanism 4.

According to the power steering device 1 having the above configuration of the present embodiment, it is possible to suppress a steering assist force providing amount upon the steering wheel-holding at the manual operation and also at the automatic operation.

Therefore, at the manual operation, the odd or awkward feeling of the steering, caused by the fact that the excessive steering assist force is provided upon the steering wheel-holding, can be suppressed. Further, at the automatic operation, the redundant torque occurring upon the steering wheel-holding can be reduced.

In addition, in the present embodiment, since the steering wheel-holding offset torque Tf is the fixed value determined on the basis of the hysteresis characteristic of the hydraulic assist mechanism 4, the decrease-correction of the torque command signal Tm* can be performed without excess and deficiency.

Other working and effects of the present embodiment are substantially the same as those of the first embodiment.

Third Embodiment

Figure 10:
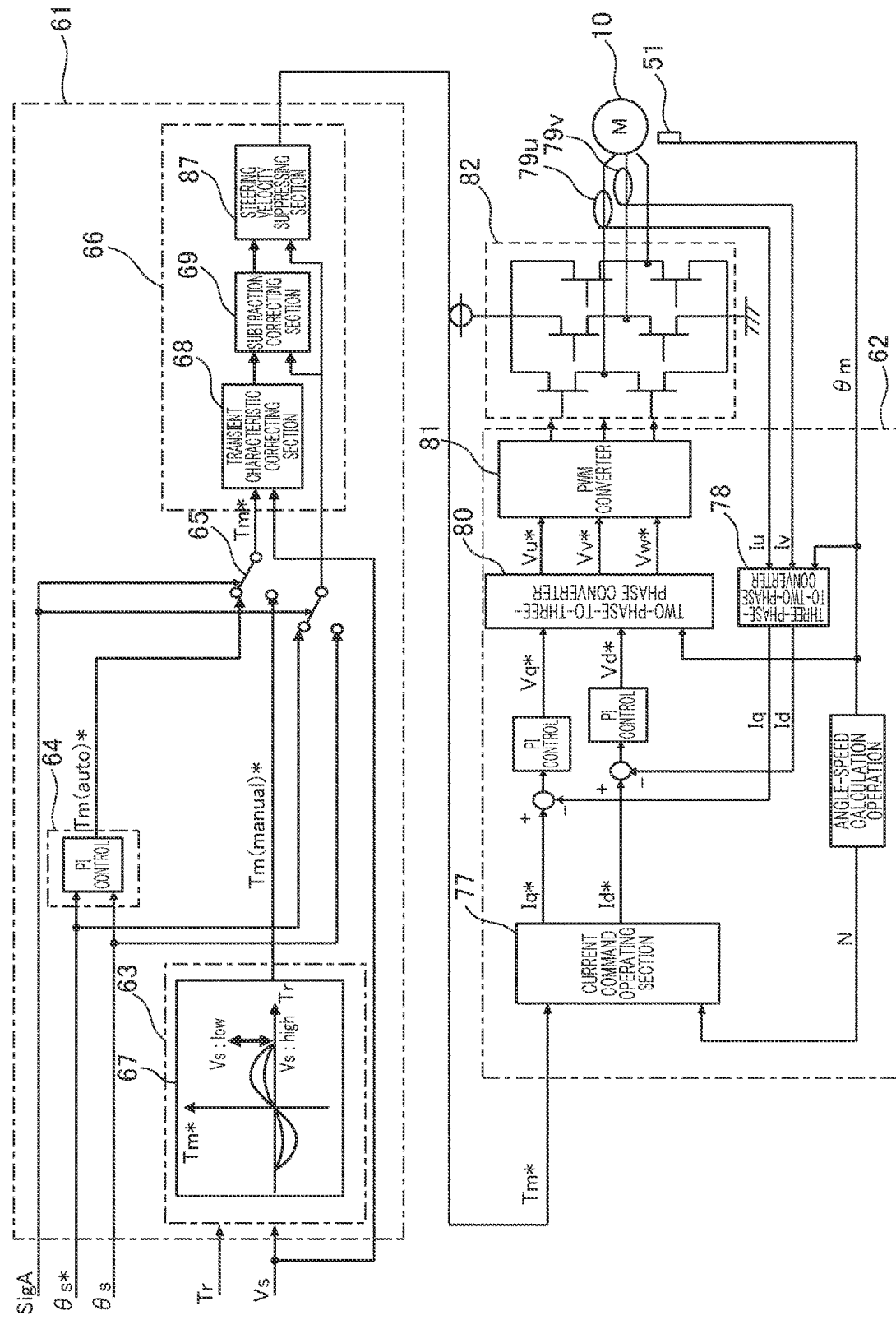
FIG. 10 is a control block diagram showing a configuration of an operating circuit of a control unit according to a third embodiment.

In a third embodiment shown in FIG. 10, although a basic configuration is the same as that of the first embodiment, the torque command correction operating section 66 is provided with a steering velocity suppressing section 87 configured to suppress an excessive increase of the steering velocity ωs by decrease-correcting the torque command signal Tm*.

Figure 11:
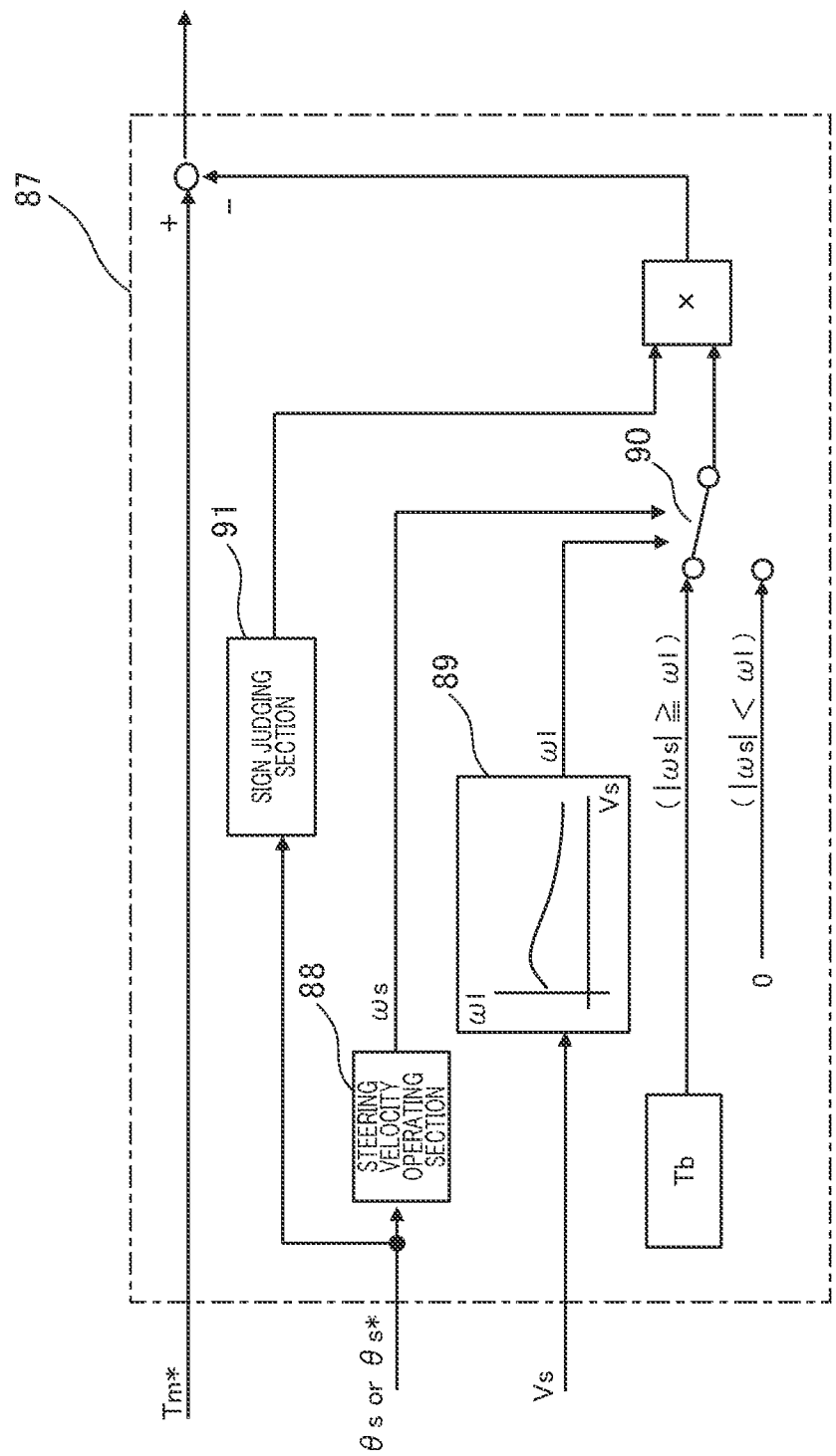
FIG. 11 is a diagram showing details of control of a steering velocity suppressing section of the third embodiment.

More specifically, as shown in FIG. 11, first, the steering velocity suppressing section 87 calculates a steering velocity ωs, by a steering velocity operating section 88, by differentiating the steering angle θs at the manual operation or the steering angle command θs* at the automatic operation with respect to time.

Subsequently, the steering velocity suppressing section 87 calculates a steering velocity limit value ωl by a steering velocity limit value calculating map 89 that is previously prepared from the vehicle speed Vs.

The steering velocity limit value calculating map 89 used at this time is set so that when the vehicle speed Vs is the predetermined middle or high speed or greater, as the steering velocity limit value ωl, a relatively small value is calculated.

Thereafter, the steering velocity suppressing section 87 judges whether or not an absolute value |ωs| of the steering velocity ωs is equal to or greater than the steering velocity limit value ωl, by a switch judging section 90. When judged that the absolute value |ωs| of the steering velocity ωs is less than the steering velocity limit value ωl, the steering velocity suppressing section 87 does not perform the correction of the torque command signal Tm*.

On the other hand, when judged that the absolute value |ωs| of the steering velocity ωs is equal to or greater than the steering velocity limit value ωl, after adding a proper sign derived from the steering angle θs (the steering angle command θs*) by a sign judging section 91 to a previously stored deceleration torque Tb, by subtracting the deceleration torque Tb from the torque command signal Tm*, the torque command signal Tm* is decrease-corrected.

When the steering velocity ωs is high (a high velocity), if the response delay of the hydraulic assist mechanism 4 is compensated by the transient characteristic correcting section 68 in a normal way, there may be a risk that the steering feeling (a sense of the steering) of the steering wheel 6 will be too light and a vehicle stability will be deteriorated. Especially when the steering velocity ωs is high and the vehicle speed Vs is the predetermined middle or high speed or greater, this deterioration of the vehicle stability noticeably or clearly appears.

In contrast to this, in the present embodiment, by the steering velocity suppressing section 87, when the steering velocity ωs is greater than the steering velocity limit value ωl, the torque command signal. Tm* is decrease-corrected. With this correction, since the steering assist force provided to the steering mechanism 2 is decreased, an increase of the steering velocity ωs is suppressed, then the deterioration of the vehicle stability, resulting from the above factor, can be suppressed.

Further, in the present embodiment, especially when the steering velocity ωs is high and the vehicle speed Vs is the predetermined middle or high speed or greater, which cause apprehension that the vehicle stability will be deteriorated, as the steering velocity limit value ωl, a small value is calculated. With this, an increase of the steering velocity ωs during travel at middle or high speed is suppressed, thereby suppressing the deterioration of the vehicle stability, resulting from the above factor, more effectively.

Fourth Embodiment

Figure 12:
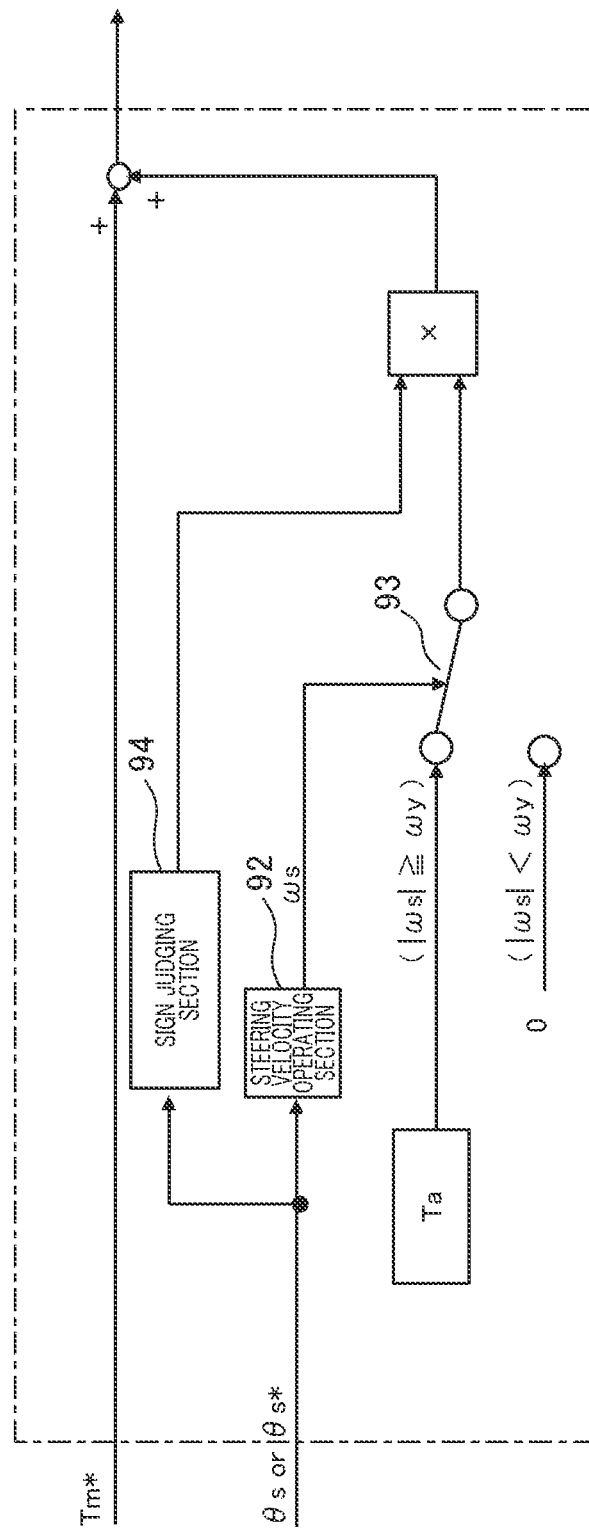
FIG. 12 is a diagram showing details of control of a transient characteristic correcting section according to a fourth embodiment.
Figure 13:
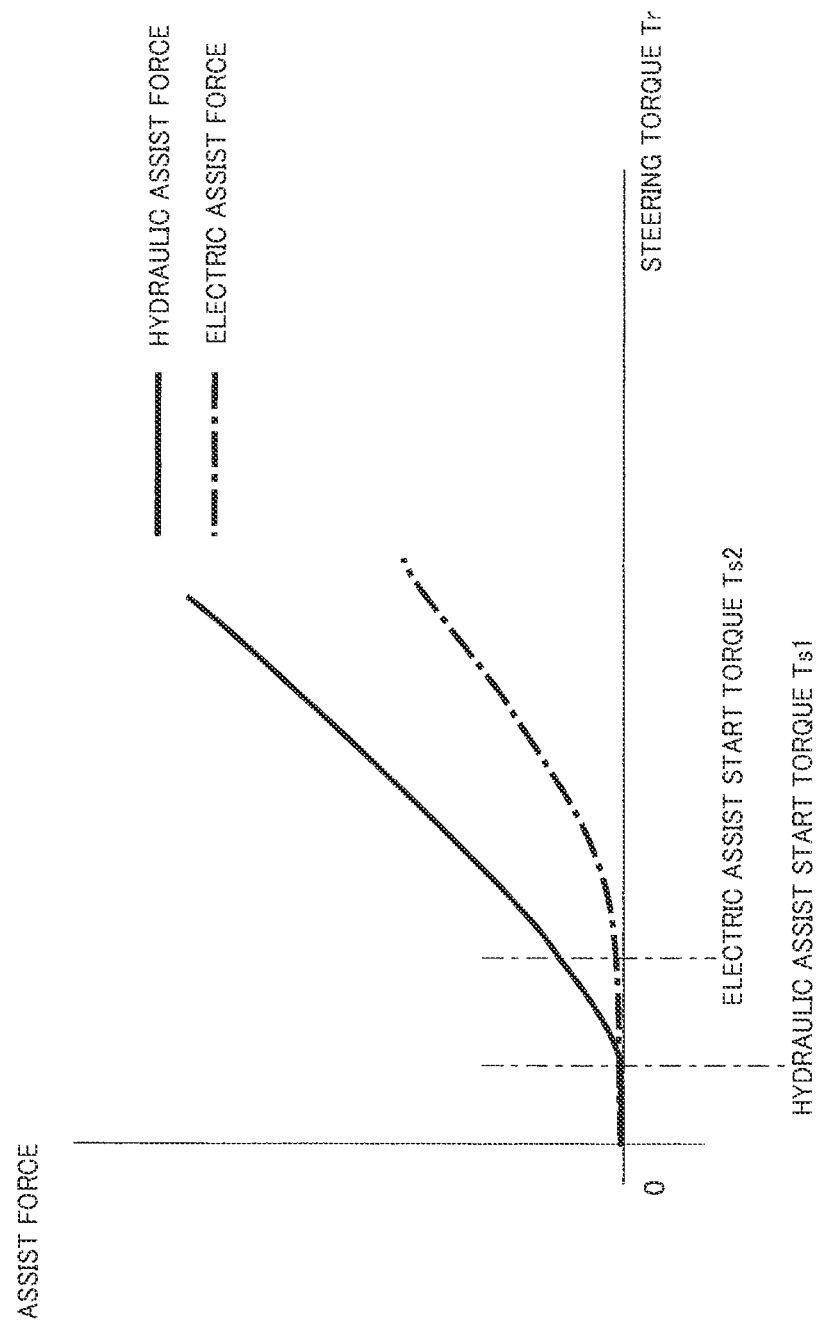
FIG. 13 is a drawing showing assist characteristics of the hydraulic assist mechanism and an electric assist mechanism of the fourth embodiment.

In a fourth embodiment shown in FIGS. 12 and 13, although a basic configuration is the same as that of the first embodiment, the control of the transient characteristic correcting section 68 is changed.

That is, as shown in FIG. 12, first, the transient characteristic correcting section 68 of the present embodiment calculates a steering velocity ωs, by a steering velocity operating section 92, by differentiating the steering angle θs at the manual operation or the steering angle command θs* at the automatic operation with respect to time. Subsequently, after sending the steering velocity ωs to a switch judging section 93 serving as a steering velocity signal receiving section, the transient characteristic correcting section 68 judges whether or not an absolute value |ωs| of the steering velocity ωs is equal to or greater than a predetermined value ωy, by the switch judging section 93.

When judged that the absolute value |ωs| of the steering velocity ωs is less than the predetermined value ωy, the transient characteristic correcting section 68 does not perform the correction of the torque command signal Tm*.

On the other hand, when judged that the absolute value |ωs| of the steering velocity ωs is equal to or greater than the predetermined value ωy, namely, when judged that the steering wheel 6 is rapidly steered, a proper sign derived from the steering angle θs (the steering angle command θs*) by a sign judging section 94 is added to a previously stored rapid steering-judged increase torque Ta.

Therefore, by adding the rapid steering-judged increase torque Ta to the torque command signal Tm*, the torque command signal Tm* is increase-corrected.

The rapid steering-judged increase torque Ta added to the torque command signal Tm* is an arbitrary fixed value that can compensate a dead zone (or a neutral zone) of the rotary valve 30.

Further, as shown in FIG. 13, the electric assist mechanism 5 of the present embodiment is configured to start the steering assist when inputting the steering torque Tr that is higher than a hydraulic assist start torque Ts1 of a time when the hydraulic assist mechanism 4 starts the steering assist.

That is, the control unit 13 of the present embodiment is configured to start the drive control of the hollow shaft motor 10 when the steering torque Tr is equal to or greater than an electric assist start torque Ts2 that is a steering start torque, and the power cylinder 29 is configured to start to provide the steering force to the steering mechanism 2 in a region in which the steering torque Tr is smaller than the electric assist start torque Ts2.

Here, in the present embodiment, a difference between a providing timing of the steering force by the hydraulic assist mechanism 4 and a providing timing of the steering force by the electric assist mechanism 5 is realized by changing stiffness (or rigidity) of each of the first and second torsion bars 20 and 23. That is, by setting the rigidity of the second torsion bar 23 that is a torsion bar for the torque sensor 11 to be equal to or greater than the rigidity of the first torsion bar 20 that is a torsion bar for the rotary valve 30, the hydraulic assist mechanism 4 is configured so that the steering assist force by the hydraulic assist mechanism 4 rises in advance of that by the electric assist mechanism 5.

Here, it is generally known that an influence by the response delay of the hydraulic assist mechanism 4 is great in a state in which the steering velocity ωs is high, i.e. in a state in which the rapid steering is carried out.

Therefore, in the present embodiment, the transient characteristic correcting section 68 is configured to, when the steering velocity ωs is high, increase-correct the torque command signal Tm*. With this correction, it is possible to compensate the response delay of the hydraulic assist mechanism 4 upon rapid steering, by the electric assist mechanism 5 side.

As a result, at the manual operation, since it is possible to provide the steering force with rapid response to the driver's steering operation, the steering feeling can be improved. In addition, at the automatic operation, the following performance of the steering angle θs to the steering angle command θs* especially when starting to turn the steering wheel can be improved.

Further, in the present embodiment, the electric assist start torque Ts2 of the electric assist mechanism 5 is set to be higher than the hydraulic assist start torque Ts1 of the hydraulic assist mechanism 4.

With this, since the load of the hollow shaft motor 10 is 0 in a region in which the steering torque Tr is less than the electric assist start torque Ts2, the load imposed on the hollow shaft motor 10 can be reduced.

Moreover, in the present embodiment, the assist start torques Ts1 and Ts2 of the hydraulic assist mechanism 4 and the electric assist mechanism 5 are varied according to the rigidities of the first and second torsion bars 20 and 23.

It is therefore possible to readily adjust the hydraulic assist start torque Ts1 and the electric assist start torque Ts2.

The present invention is not limited to the above embodiments. The present invention includes all design modifications and equivalents belonging to the technical scope of the present invention.

For instance, in each of the embodiments, the present invention is applied to the integral-type power steering device. However, the present invention can be applied to a rack-and-pinion-type or column-type power steering device having a transmission mechanism such as a rack bar and a tie rod.

In addition, in each of the embodiments, the control unit 13 is configured to obtain the steering velocity ωs by differentiating the steering angle θs with respect to time by the steering velocity operating section 75 etc. However, as a matter of course, the steering velocity ωs can be obtained through a sensor.

As the power steering device based on the embodiments explained above, for instance, the followings are raised.

As one aspect of the present invention, a power steering device comprises: a steering mechanism having an input shaft that rotates according to a steering operation of a steering wheel, an output shaft that is connected to the input shaft through a torsion bar and a transmission mechanism that transmits rotation of the output shaft to steered wheels; a power cylinder having a pair of hydraulic chambers that are divided by a piston and providing a steering force to the steering mechanism; a torque sensor detecting a steering torque of the steering mechanism; a rotary valve selectively supplying working fluid that is supplied from a pump provided outside the steering mechanism to the pair of hydraulic chambers of the power cylinder according to relative rotation between the input shaft and the output shaft; an electric motor providing a steering force to the input shaft; a control unit in which a microcomputer is mounted; and a torque command signal operating section provided in the control unit, the torque command signal operating section configured to calculate a torque command signal for driving and controlling the electric motor on the basis of the steering torque and a vehicle speed and when the vehicle speed is a predetermined vehicle speed or greater, set the torque command signal to 0.

As a preferable aspect of the power steering device, the control unit has a steering velocity signal receiving section configured to receive a signal of a steering velocity, and the torque command signal operating section is configured to, when the steering velocity is equal to or greater than a predetermined value, correct the torque command signal so as to increase.

As another preferable aspect of the power steering device, in anyone of the above aspects of the power steering device, the control unit has a phase lead signal generating section configured to generate a phase lead signal obtained by advancing a phase of the steering torque or the torque command signal, and the torque command signal operating section is configured to correct the torque command signal so as to increase on the basis of the phase lead signal.

As another preferable aspect of the power steering device, in anyone of the above aspects of the power steering device, the phase lead signal generating section is a filter.

As another preferable aspect of the power steering device, in anyone of the above aspects of the power steering device, the control unit has a phase lead signal generating section configured to generate a phase lead signal obtained by advancing a phase of the steering torque or the torque command signal, a torque command signal limiter section configured to provide an upper limit value for the torque command signal and a phase lead signal limiter section configured to provide an upper limit value for the phase lead signal.

As another preferable aspect of the power steering device, in any one of the above aspects of the power steering device, the upper limit value for the phase lead signal is set to be equal to or greater than the upper limit value for the torque command signal.

As another preferable aspect of the power steering device, in anyone of the above aspects of the power steering device, the torque command signal limiter section is configured to variably control the upper limit value for the torque command signal according to the vehicle speed, and the phase lead signal limiter section is configured to variably control the upper limit value for the phase lead signal according to the vehicle speed.

As another preferable aspect of the power steering device, in any one of the above aspects of the power steering device, the control unit has a motor command signal limiter section configured to provide an upper limit value of a motor command signal that is a signal obtained by adding a signal passing through the phase lead signal limiter section to a signal passing through the torque command signal limiter section.

As another preferable aspect of the power steering device, in anyone of the above aspects of the power steering device, the motor command signal limiter section is configured to variably control the upper limit value of the motor command signal according to the vehicle speed.

As another preferable aspect of the power steering device, in any one of the above aspects of the power steering device, the control unit has a steering velocity signal receiving section configured to receive a signal of a steering velocity, and the torque command signal operating section is configured to calculate the torque command signal so that when a rate of increase of the steering velocity is less than a predetermined value or when a rate of increase of the steering torque is less than a predetermined value, the steering force provided to the steering mechanism by the electric motor is smaller than the steering force provided to the steering mechanism by the power cylinder.

As another preferable aspect of the power steering device, in any one of the above aspects of the power steering device, the control unit is configured to start the drive control of the electric motor when the steering torque is equal to or greater than a steering start torque that is a predetermined value, and the power cylinder is configured to start to provide the steering force to the steering mechanism in a region in which the steering torque is smaller than the steering start torque.

As another preferable aspect of the power steering device, in any one of the above aspects of the power steering device, the torque command signal operating section is configured to calculate the torque command signal so that a rotation angle of the electric motor becomes a target angle, and in a steering wheel-holding state in which a steering velocity is equal to or less than a predetermined value, decrease-correct the torque command signal.

As another preferable aspect of the power steering device, in anyone of the above aspects of the power steering device, a difference of the steering force by the power cylinder occurs between a variation when the steering torque increases and a variation when the steering torque decreases, and the torque command signal operating section is configured to, in the steering wheel-holding state in which the steering velocity is equal to or less than the predetermined value, decrease-correct the torque command signal by an amount of the difference.

As another preferable aspect of the power steering device, in any one of the above aspects of the power steering device, the torque command signal operating section is configured to, when a steering velocity is greater than a steering velocity upper limit value calculated on the basis of the vehicle speed, decrease-correct the torque command signal.

As another preferable aspect of the power steering device, in anyone of the above aspects of the power steering device, the steering force by the power cylinder for the steering torque has a single characteristic regardless of a change of the vehicle speed.

As another preferable aspect of the power steering device, in anyone of the above aspects of the power steering device, the input shaft has a first input shaft connected to the steering wheel and a second input shaft connected to the first input shaft through a torque sensor torsion bar that is different from the torsion bar, the torque sensor detects the steering torque according to a torsion amount of the torque sensor torsion bar, and a rigidity of the torque sensor torsion bar is set to be equal to or greater than a rigidity of the torsion bar.

The invention claimed is:

1. A power steering device comprising:
a steering mechanism having an input shaft that rotates according to a steering operation of a steering wheel, an output shaft that is connected to the input shaft through a torsion bar and a transmission mechanism that transmits rotation of the output shaft to steered wheels;
a power cylinder having a pair of hydraulic chambers that are divided by a piston and providing a steering force to the steering mechanism;
a torque sensor configured to detect a steering torque of the steering mechanism;
a rotary valve configured to selectively supply working fluid that is supplied from a pump provided outside the steering mechanism to the pair of hydraulic chambers of the power cylinder according to relative rotation between the input shaft and the output shaft;
an electric motor providing a steering force to the input shaft;
a control unit in which a microcomputer is mounted; and
a torque command signal operating section provided in the control unit, the torque command signal operating section configured to calculate a torque command signal for driving and controlling the electric motor on the basis of the steering torque and a vehicle speed and when the vehicle speed is a predetermined vehicle speed or greater, set the torque command signal to 0.

2. The power steering device as claimed in claim 1, wherein:
the control unit has a steering velocity signal receiving section configured to receive a signal of a steering velocity, and
the torque command signal operating section is configured to, when the steering velocity is equal to or greater than a predetermined value, correct the torque command signal so as to increase.

3. The power steering device as claimed in claim 1, wherein:
the control unit has a phase lead signal generating section configured to generate a phase lead signal obtained by advancing a phase of the steering torque or the torque command signal, and
the torque command signal operating section is configured to correct the torque command signal so as to increase on the basis of the phase lead signal.

4. The power steering device as claimed in claim 3, wherein:
the phase lead signal generating section is a filter.

5. The power steering device as claimed in claim 1, wherein:
the control unit has a phase lead signal generating section configured to generate a phase lead signal obtained by advancing a phase of the steering torque or the torque command signal, a torque command signal limiter section configured to provide an upper limit value for the torque command signal and a phase lead signal limiter section configured to provide an upper limit value for the phase lead signal.

6. The power steering device as claimed in claim 5, wherein:
the upper limit value for the phase lead signal is set to be equal to or greater than the upper limit value for the torque command signal.

7. The power steering device as claimed in claim 6, wherein:
the torque command signal limiter section is configured to variably control the upper limit value for the torque command signal according to the vehicle speed, and
the phase lead signal limiter section is configured to variably control the upper limit value for the phase lead signal according to the vehicle speed.

8. The power steering device as claimed in claim 5, wherein:
the control unit has a motor command signal limiter section configured to provide an upper limit value of a motor command signal that is a signal obtained by adding a signal passing through the phase lead signal limiter section to a signal passing through the torque command signal limiter section.

9. The power steering device as claimed in claim 8, wherein:
the motor command signal limiter section is configured to variably control the upper limit value of the motor command signal according to the vehicle speed.

10. The power steering device as claimed in claim 1, wherein:
the control unit has a steering velocity signal receiving section configured to receive a signal of a steering velocity, and
the torque command signal operating section is configured to calculate the torque command signal so that when a rate of increase of the steering velocity is less than a predetermined value or when a rate of increase of the steering torque is less than a predetermined value, the steering force provided to the steering mechanism by the electric motor is smaller than the steering force provided to the steering mechanism by the power cylinder.

11. The power steering device as claimed in claim 1, wherein:
the control unit is configured to start the drive control of the electric motor when the steering torque is equal to or greater than a steering start torque that is a predetermined value, and
the power cylinder is configured to start to provide the steering force to the steering mechanism in a region in which the steering torque is smaller than the steering start torque.

12. The power steering device as claimed in claim 1, wherein:
the torque command signal operating section is configured to calculate the torque command signal so that a rotation angle of the electric motor becomes a target angle, and in a steering wheel-holding state in which a steering velocity is equal to or less than a predetermined value, decrease-correct the torque command signal.

13. The power steering device as claimed in claim 12, wherein:
a difference of the steering force by the power cylinder occurs between a variation when the steering torque increases and a variation when the steering torque decreases, and
the torque command signal operating section is configured to, in the steering wheel-holding state in which the steering velocity is equal to or less than the predetermined value, decrease-correct the torque command signal by an amount of the difference.

14. The power steering device as claimed in claim 1, wherein:
the torque command signal operating section is configured to, when a steering velocity is greater than a steering velocity upper limit value calculated on the basis of the vehicle speed, decrease-correct the torque command signal.

15. The power steering device as claimed in claim 1, wherein:
the steering force by the power cylinder for the steering torque has a single characteristic regardless of a change of the vehicle speed.

16. The power steering device as claimed in claim 1, wherein:
the input shaft has a first input shaft connected to the steering wheel and a second input shaft connected to the first input shaft through a torque sensor torsion bar that is different from the torsion bar,
the torque sensor is configured to detect the steering torque according to a torsion amount of the torque sensor torsion bar, and
a rigidity of the torque sensor torsion bar is set to be equal to or greater than a rigidity of the torsion bar.

* * * * *